US00RE36809E

United States Patent [19]

Ramsey et al.

[11] E Patent Number: Re. 36,809

[45] Reissued Date of Patent: Aug. 8, 2000

[54] COIL SPRING INTERIOR ASSEMBLY METHOD AND APPARATUS

[75] Inventors: Henry R. Ramsey, Dudley, Mass.; Joseph R. Jordan, Cincinnati, Ohio

[73] Assignee: L&P Property Management Company, South Gate, Calif.

[21] Appl. No.: 09/204,371

[22] Filed: Dec. 1, 1998

Related U.S. Patent Documents

Reissue of:

[64] Patent No.: 5,579,810
Issued: Dec. 3, 1996
Appl. No.: 08/399,098
Filed: Mar. 3, 1995

[51] Int. Cl.[7] ..... B21F 27/16

[52] U.S. Cl. ..... 140/3 CA; 140/92.7

[58] Field of Search ..... 140/3 CA, 92.3, 140/92.4, 92.7, 92.8

[56] References Cited

U.S. PATENT DOCUMENTS 3,205,915 9/1965 Kamp .
3,386,561 6/1968 Spuhl .
3,533,114 10/1970 Karpen .
3,774,652 11/1973 Sturm .
3,918,473 11/1975 Ramsey .
4,112,721 9/1978 Takase et al. .
4,413,659 11/1983 Zängerle .
4,625,349 12/1986 Higgins .
4,679,266 7/1987 Kraft .
4,705,079 11/1987 Higgins .

*Primary Examiner*—Lowell A. Larson
*Attorney, Agent, or Firm*—Wood, Herron & Evans, L.L.P.

[57] ABSTRACT

A spring interior forming method and apparatus provides a spring interior assembler and a coil row transfer station upstream of the assembler having at least one conveyer extending therethrough. A coil former is provided at an upstream end of the conveyor and is operated through a plurality of cycles, each to feed one spring coil onto the conveyor. In one embodiment, a single former is provided with a single conveyor extending therefrom through the transfer station. In a second embodiment, two such coiler-conveyor combinations is provided. In a third embodiment, one conveyor through the transfer station is provided with two coilers, each having a feeder preferably in the form of a conveyor, that selectively feed spring coils, which may be of different types, to a cross-over station for feed onto the transfer station conveyor. In a fourth embodiment, each coiler accumulates springs at its output while awaiting queing by the cross-over station. Between consecutive cycles of the feeding of a spring onto the transfer conveyor, a stepper motor or other servo-type motor advances the conveyor a programmed distance, thereby providing the capability for obtaining different programmed spacings between coils on the rows presented by the transfer conveyor to the transfer station.

43 Claims, 7 Drawing Sheets

COIL SPRING INTERIOR ASSEMBLY METHOD AND APPARATUS

Matter enclosed in heavy brackets [ ] appears in the original patent but forms no part of this reissue specification; matter printed in italics indicates the additions made by reissue.

The present invention relates to the formation and assembly of coil spring interiors, and particularly to a method and apparatus for feeding and positioning coils in spaced relationships to each other for assembly into such spring interiors.

BACKGROUND OF THE INVENTION

In the manufacture of spring interiors such as are used to provide the inner spring assemblies of mattresses and similar products, spring assembler machines are employed to lace together rows of coil springs into arrays that are usually rectangular. Such arrays of springs are usually assembled as a plurality of vertically oriented helical coil springs often having hour-glass shapes, arranged horizontally in a grid that lies in a plane. The more preferred arrangements of spring interior manufacturing machines include a coil former, which makes individual springs from continuous wire, that feeds coil springs as they are formed to the assembly apparatus.

Efficient production of spring interiors is largely dependent on the speed with which springs can be fed to the assembler. Where the array of springs is made up of a plurality of identical springs evenly spaced in each of the rows, devices have been provided for automatically feeding rows of the springs to a transfer device and then translating the row with a multiple gripper mechanism bodily into the assembler, parallel to the previously transferred rows. One early version of such a machine is disclosed in U.S. Pat. No. 3,386,561 to Spühl and a later version is disclosed in U.S. Pat. No. 3,774,652 to Strum. Such machines avoid the extra handling associated with loading the springs by coupling the output conveyor of a spring forming machine directly to the infeed of the transfer mechanism. As a rule, the speed of such a combination is limited by the spring coiling machine, which produces individual springs slower than the assembler can assemble them.

Attempts to speed up the spring interior assembly operation have led to the use of two coil forming machines instead of one, arranged with their output conveyors in parallel rows that extend through a transfer station. Such a combination is disclosed in U.S. Pat. No. 4,413,659 to Zängerle. In such a combination, the gripper mechanism at the transfer station operates to transfer rows of springs alternately from each of the output conveyors from the coilers, allowing one of the coilers to operate to produce one row of coils while the row of coils previously formed by the other coiler is being transferred to the assembler. With such an arrangement, each coiler may use the time required for two of the assembler machine cycles to produce one row of springs. Such an apparatus, however, still presents evenly spaced rows of coils to the transfer mechanism.

Many spring interior products are better formed when the coil springs are not uniformly spaced in the rows. However, combination machines of the type described above produce a steady stream or series of formed springs at the output of the toiler and present the coils to the transfer mechanism spaced evenly in rows. Where irregularly spaced coils are required, it has been necessary to feed the coils to the transfer mechanism evenly spaced to the average desired coil spacing and then to employ independently moveable grippers to transfer each of the springs to the assembler, moving different springs transversely in differing amounts in the transfer to achieve the desired irregular spring spacing. Assemblers with transfer mechanisms having such capability are illustrated and described U.S. Pat. Nos. 4,625,349 and 4,705,079 to Higgins, both hereby expressly incorporated by reference herein.

Even with the utilization of a spacing altering gripper mechanism at the transfer station, many spring interiors designs benefit from not only springs that are irregularly spaced, but include combinations of springs of more than one type, size or stiffness in each row. Direct connection of the output conveyors of spring coilers to the infeed of a transfer station does not alone provide such a capability. Accordingly, various manual steps are required in the handling of the springs fed to a spring interior assembler in order to produce many of the desired products. Further, in systems where speed of operation is desired, flexibility in the spacing and arrangement of springs is even more difficult to achieve.

The machines of the prior art do not provide the capacity, speed, flexibility of variable spring spacing or of mixing the types of springs that are presented on the conveyor to the transfer mechanism that feeds a spring interior assembly machine. Accordingly, there remains a need for faster and more flexible spring assembly methods and machines.

SUMMARY OF THE INVENTION

A primary objective of the present invention is to provide a spring interior assembly method and apparatus that will provide flexibility in the spacing and selection of springs that form the spring interior array, particularly while the springs are on the conveyor that feeds an assembly machine. It is a more particular objective of the present invention to provide a spring interior forming method and apparatus in which springs can be formed and sent directly to a spring interior assembler prearranged at variable spacings in rows. It is still further objective of the present invention to provide such a method and apparatus that will accommodate rows of springs of more than one size, stiffness or type, and especially that will accommodate a variety of spring sizes, stiffnesses and types in each of the individual spring rows.

Still a further objective of the present invention is to provide a method and apparatus for producing springs and feeding them directly to a spring interior assembly machine from more than one simultaneously operating coil forming machine, either in separate parallel rows or with the coils merged into a single row. It is a particular objective of the present invention to provide such a multiple coiler method and apparatus that provides flexibility in the spacing of the coils along each row and the interleaving of coils of different types in the same row. Another objective of the present invention is to provide such a flexible method and apparatus that allows the various components or subsystems of the machine to function, and the method to be performed, at optimum capacity and independently of the operations of the other components or subsystems during the greater portions of their cycles.

In accordance with the principles of the present invention, a spring interior assembling method and apparatus are provided with at least one on-line coiler having an outfed conveyor that feeds directly to an assembler portion of the apparatus, with the outfeed conveyor of the coiler being controllable independently of the operation of the coil forming part of the system, but coordinated therewith by a single controller or using interrelated controllers or control logic. Preferably, the outfeed conveyor of the coiler is controlled by a motor that will respond to a control signal to move springs a known distance downstream. Such a motor or drive is herein referred to generically as a servo motor, which employs feedback to the controller, or uses some internal feedback or other approach to produce a precise measured response to a control signal. In the preferred embodiments of the invention, such a motor is a motor of the stepper motor type that operates to move the conveyor that it drives a fixed, and usually small, incremental distance in response to a pulse from a controller, whereby the conveyor can be advanced a precise distance by sending to it a control signal of a precise predetermined number of pulses.

According to one preferred embodiment of the invention, a coil forming machine is provided having an output conveyor that serves as an infeed conveyor to a spring interior assembler, extending in a row across the input side of the assembler through a transfer station at which a transfer mechanism picks up a row of coils and feeds them to the assembler. The conveyor is stepper motor driven in response to signals from a controller that is programmed to maintain a series of different coil-to-coil spacings along each row of coils produced by the coiler. The controller synchronizes the operation of the coiler or coil feeder with the indexing of the conveyor so that formed coils are placed onto the conveyor at correct preprogrammed spacings from the previously placed coil. The controller also coordinates the advancing of the conveyor to bring a completed row of variably spaced coils to the transfer station with the triggering of the transfer mechanism to load the assembler with the row of coils and also with the triggering of the assembler to begin lacing the coils of the row together and the row of coils to the previous row of coils of the spring assembly.

In a further embodiment of the invention, two coilers and conveyors are arranged in a single machine with the two coilers having output conveyors extending in parallel through a transfer station, with each conveyor carrying springs that are variably spaced thereon. Each of the coilers operates independently in the manner of the embodiment set forth above, with the transfer mechanism of the transfer station being capable of transferring rows of variably spaced coils alternately from each of the conveyors. This embodiment of the invention has the additional capability of presenting coils on one conveyor that differ in size, type or stiffness from those presented on the other conveyor. Such differing types of coils are placed upon their respective conveyors at programmed spacings under the control of a programmed controller. The transfer mechanism may be operated to remove coils alternately from the conveyors or to remove coils from both conveyors and combine them into single rows of multiple type, variably spaced coils.

In still a further embodiment of the invention, there is provided a machine formed of two or more coilers each having an output conveyor or feeder extending to a transfer station or to an intermediate cross-over station at which the coils from each of the toiler output feeders or outfeed conveyors are shuttled or shifted onto a single transfer station conveyor in such a way that rows of coils on the transfer conveyor are formed by combinations of coils from each of the coilers that are spaced at variable spacings on the transfer conveyor. A controller is programmed to synchronize the operations of the coilers, their outfeed conveyors, which may but need not be separately driven by servo motors, the cross-over or shifting mechanism, and the transfer conveyor, which is separately driven by an independently controllable servo motor. The controller also times the operation of the transfer mechanism and the assembler as in the other embodiments described above.

A still further embodiment of the invention includes the plurality of coilers and outfeed conveyors and the single separate transfer conveyor of the previously referred to embodiment, with additional conveyor elements at the outputs of each of the toilers that facilitate the accumulation of coils on the output conveyors of the coilers so that the operation of the coilers is not slowed awaiting queuing of coils by the transfer conveyor. Thus, the coilers may keep operating at full capacity even though the demand by the transfer conveyor for coils from that coiler is delayed, with the formed coils accumulating on the individual branches of the conveyor extending from each coiler. Furthermore, many types of springs can be closely nested on the coiler output conveyors, thus greatly enhancing the utilization of the coilers, even when the assembler or transfer mechanism thereto is paused or otherwise idle, thereby providing a supply of coils that will allow full speed running of the assembler when its operation resumes. With such an ability to accumulate coils from the coilers, output conveyor portions that feed the cross-over mechanism can operate immediately on call by the controller to load a coil to the transfer conveyor, without coordinating such feeding with the forming of the coils by the toiler.

According to the present invention, rows of coils are presented to an assembler prearranged and spaced in programmed relationship to the ultimate design of the array, and coils of different types, sizes and stiffnesses can be combined in a fast, efficient automated operation. Multiple coilers may be connected on-line with the assembler. Wide flexibility in product type is provided.

These and other objectives and advantages of the present invention will be more readily apparent from the following detailed description of the drawings and preferred embodiments, in which:

DETAILED DESCRIPTION OF THE PREFERRED EMBODIMENTS

Figure 1:
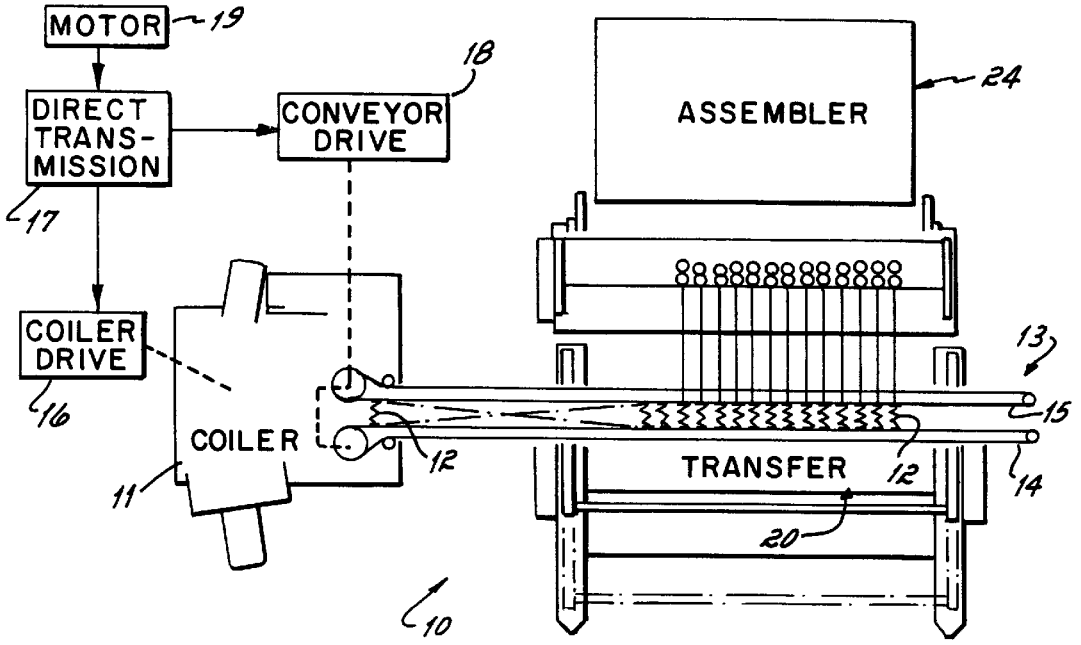
PRIOR ART FIG. 1
FIG. 1 is a diagrammatic representation of a typical spring coil assembly machine of the prior art.

Referring to FIG. 1, one apparatus 10 of the prior art for manufacturing spring interiors is diagrammatically illustrated. One such apparatus, for example, is described U.S. Pat. No. 3,386,561 to Spühl. Such an apparatus includes a coiler 11, which produces a series of coil springs 12 and delivers them sequentially onto a spring conveyor 13. The conveyor 13 is formed of a pair of opposed endless belts 14 and 15 which compress the springs 12 between them and advance the springs 12, while maintaining them at evenly spaced intervals, to a transfer mechanism 20. The conveyor 13 operates in stepwise fashion, in synchronism with the intermittent forming of coils 12 by the coiler 11. Typically, coordinated operation of the conveyor 13 and coiler 11 is maintained by the provision of a coiler drive 16 for the coiler 11 that is directly linked through a mechanical transmission 17 to a conveyor drive 18 of the conveyor 13, with both drives 16 and 18 being driven through the transmission 17 by the same motor 19.

In typical operation, the coiler 11 operates at its combined maximum capacity until a filled row of coils 12 is presented on the conveyor 13 to the transfer mechanism 20. When a filled row is presented to the transfer mechanism 20 by the conveyor 13, a gripper assembly of the transfer mechanism (not shown) simultaneously engages each of the springs 12 of the row and transfers them to an assembler 24 where they are laced together and to the coils of adjacent rows of springs in the formation of a spring interior. During the operation of the transfer mechanism 20, the conveyor 13 and the coiler 11 pause momentarily while the springs 12 are being transferred from the conveyor 13 into the assembler 24. When the gripper assembly is sufficiently clear of the conveyor 13 so as to not interfere with its operation, the operation of the coiler 11 and conveyor 13 resume.

Figure 2:
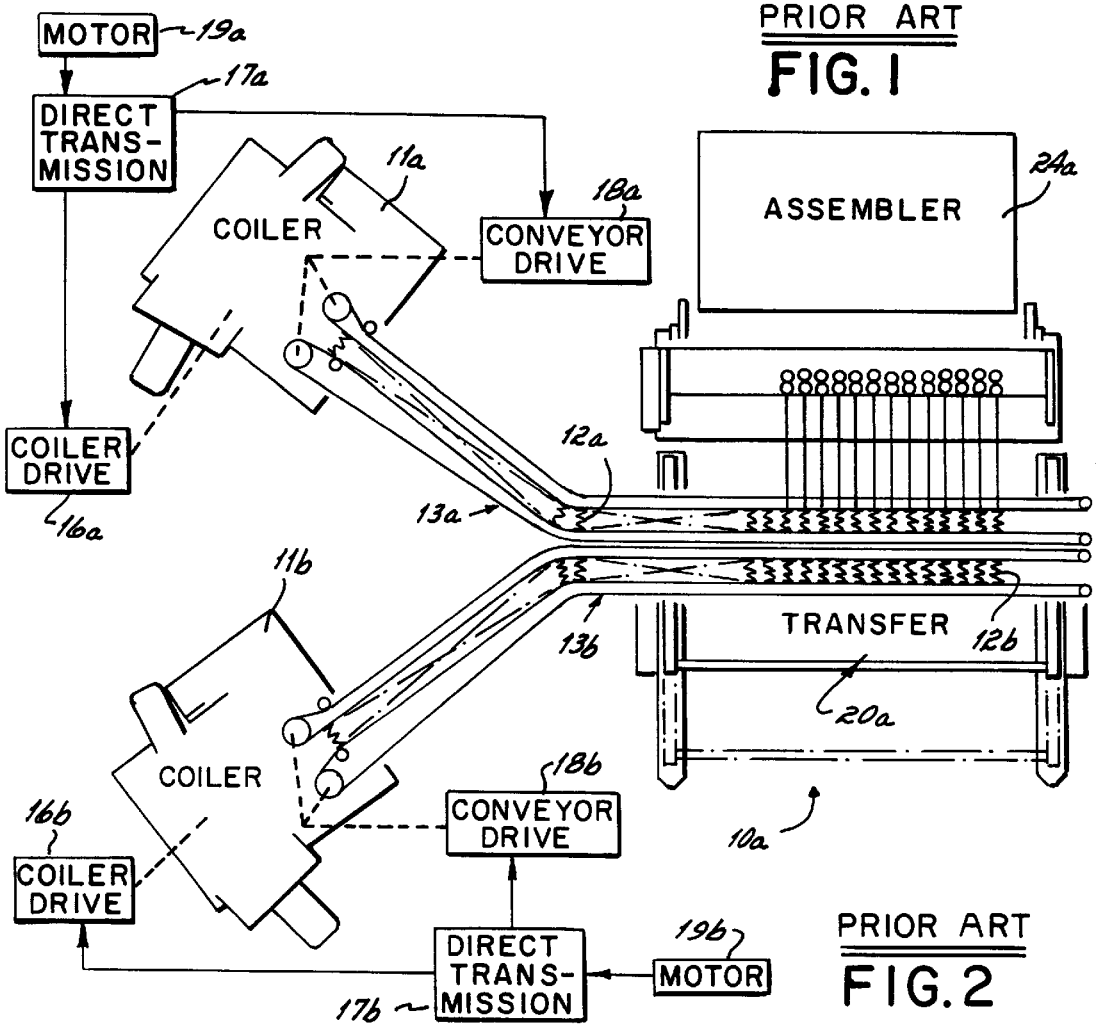
PRIOR ART FIG. 2
FIG. 2 is a diagrammatic representation similar to FIG. 1 illustrating another spring coil assembly machine of the prior art.

One of the first recognized disadvantages of the arrangement of FIG. 1 has been that the coiler 11 produces springs 12 at a rate that is slower than the rate at which the transfer mechanism 20 and assembler 24 can remove and process springs from the conveyor 13. To overcome this disadvantage, the machine 10a of FIG. 2 was proposed in the prior art. The machine 10a of FIG. 2 provides a pair of coilers 11a and 11b that respectively form two rows of springs 12a and 12b that are respectively fed along two parallel paths by a pair of conveyors 13a and 13b. In this embodiment, a modified transfer mechanism 20a is provided with a gripper assembly (not shown) that picks up rows of coils 12a and 12b alternately from the respective conveyors 13a and 13b and feeds them to assembler 24. Such a machine 10a is disclosed in U.S. Pat. No. 4,413,659 to Zängerle. The conveyors 13a and 13b operate in stepwise fashion, in synchronism with the intermittent forming of coils 12a and 12b by the respective coilers 11a and 11b. Typically, coordinated operation of the conveyor 13a, 13b and coilers 11a, 11b is maintained by the provision of respective coiler drives 16a and 16b, respectively, that are directly linked through a respective mechanical transmission 17a and 17b to conveyor drives 18a and 18b, respectively. Each of the sets of drives, 16a and 18a, and 16b and 18b, are respectively driven through the transmissions 17a and 17b by the drive motors 19a and 19b.

In typical operation, the apparatus 10a operates at its maximum capacity by operating each of the coilers 11a and 11b and conveyors 13a and 13b until each or either presents a filled row of coils 12a or 12b to the transfer mechanism 20a. When a filled row is presented to the transfer mechanism 20a by one of the conveyors, 13a for example, a gripper assembly of the transfer mechanism (not shown) is positioned to simultaneously engage the springs 12a of the row and transfer them to assembler 24a where they are laced adjacent rows of springs in the formation of a spring interior. During the operation of the transfer mechanism 20, conveyor 13a and, and in some situations even the coiler 11a, can be required to pause momentarily while the springs 12a are being transferred from the conveyor 13a into the assembler 24a. In many applications, stopping the coiler is undesirable and can affect the quality of the springs, and should be avoided. When the gripper assembly is sufficiently clear of the conveyor 13a so as to not interfere with its operation, the operation of the coiler 11a and conveyor 13a resume. Then, when a filled row is next presented to the transfer mechanisms 20a by the other one of the conveyors 13b, the gripper assembly is repositioned to simultaneously engage the springs 12b to transfer them to assembler 24a where they too are laced to the previously fed row of springs 12a in the formation of the spring interior. During the operation of the transfer mechanism 20a to pick up the springs 12b from the conveyor 13b, conveyor 13b and coiler 11b similarly pause momentarily. When the gripper assembly is sufficiently clear of the conveyor 13b so as to not interfere with its operation, the operation of the coiler 11b and conveyor 13b may resume.

With both of the above described machines 10 and 10a of the prior art, the spacing of coils 12 on a conveyor 13 for presentation to the transfer mechanism 20a is dictated by the operation of a coiler 11, which feeds coils at evenly spaced intervals along conveyor 13. With the present invention, however, there are provided machines having both the ability to space springs on the conveyors at differing and programmed intervals and also the ability to interposition springs of different shapes and types in programmed arrangements on the conveyors. Four embodiments of such machines are set forth diagrammatically in FIGS. 3–6 described below.

Figure 3:
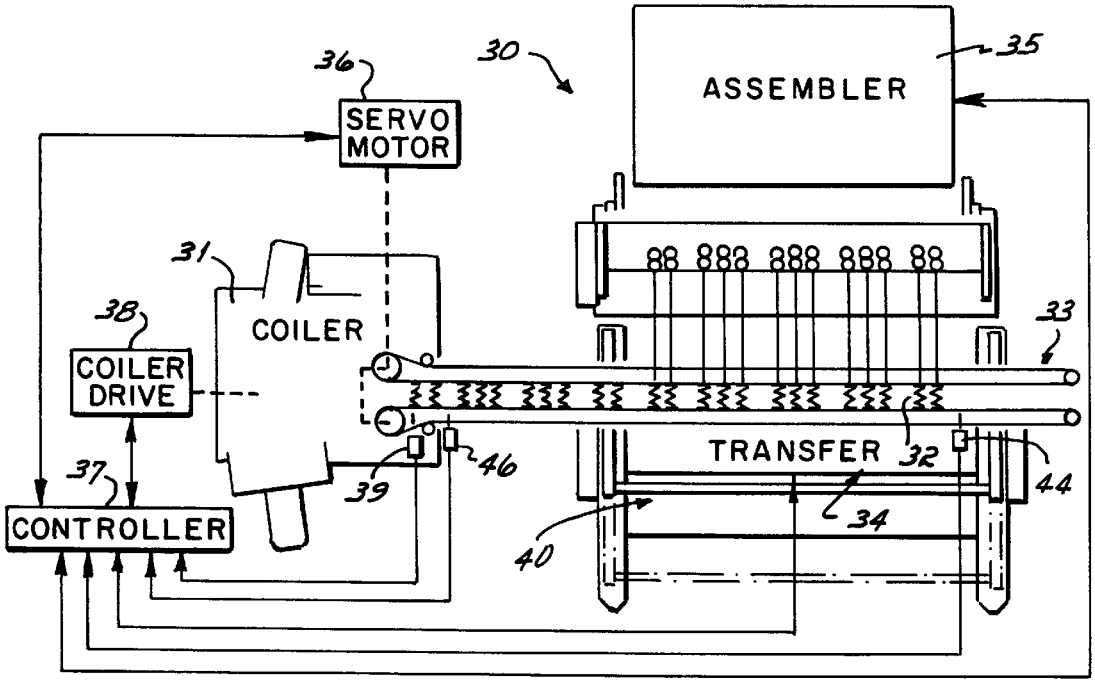
FIG. 3 is a diagrammatic representation of one embodiment of a spring coil assembly machine according to principles of the present invention.

Referring to FIG. 3, there is provided, according to one embodiment of the present invention, a spring interior manufacturing apparatus 30 that includes a coiler 31 that is similar to the coilers 11 referred to above, and functions to produce individual coil springs 32. These coil springs 32 are produced, one for each operating cycle of the coiler 31, and fed onto a conveyor 33, which, similar to the conveyors 13 described above, is an opposed belt conveyor that sequentially presents a row of springs 32 to a transfer mechanism 34 for simultaneous transfer from the conveyor 33 to an assembler 35 for assembly into a spring interior. Suitable spring coilers 31 for use with the invention are known in the art, one such coiler being described in British Patent No. 1,327,795 to Willi Gerstorfer entitled "Improvements in or relating to Machines for the Manufacture of Compression Spring Strips from Wire, for example for Upholstery Inserts." A conveyor 33, transfer mechanism 34 and assembler 35 that are adaptable for use with the invention as set forth herein are described in U.S. Pat. Nos. 3,386,561 to Spühl and 3,774,652 to Sturm, all expressly incorporated by reference herein. The concepts of the present invention can be used or adapted for use with machines of the types disclosed in all of these incorporated patents.

Unlike the conveyors 13 described above, the conveyor 33 is not directly linked to the coiler drive 38 of the coiler 31 but is capable of operating separately from the coiler 31, preferably being separately driven by a servo motor 36. The servo motor 36 is preferably of the stepper motor type that indexes the conveyor 33 is response to signals, for example in the form of pulses, output by a programmable controller 37. The motor 36 indexes the conveyor 33 a fixed incremental distance in response to each pulse from the controller 37. The fixed incremental distance is small, and may be, for example, 1/500th of the revolution of a drive wheel for each pulse received, thus providing precise control of the motion of the conveyor 33. The controller 37 also synchronizes the motion of the conveyor 33 with the sequential operation of the coiler 31 which is driven by coiler drive 38a, so that a formed coil 32 can be precisely placed at the input end of the conveyor 33 so as to precisely establish a spacing between each coil 32 so placed and the previously placed coil 32 on the conveyor 33.

Operating separately under the control of the controller 37, the coiler 31 forms and places a row of coils 32 on the conveyor 33 at intervals determined by the controller 37 as it coordinates the movement of the conveyor 33. The spaces between the adjacent coils 32 of the row are determined in accordance with a program of the controller 37. Preferably, whenever fewer than the total number of coils have been made than are required for the job being run, the coiler 31 will form a coil 32 and, if the controller 37 concludes that the conveyor 33 is positioned to receive the formed coil 32, the coiler 31 feeds the formed coil 32 onto the conveyor 33 and the coiler 31 then goes on to form the next coil, if another coil 32 is called for by the job. If the conveyor 33 is not in such position to receive a coil 32, the coiler 31 pauses to wait for the controller 37 to signal that the conveyor 33 is so positioned. Once a coil 32 is fed by the coiler 31 onto the conveyor 33, a sensor 39, which may be provided, may signal that the conveyor 33 may now be indexed. Thereby, the conveyor never indexes without the presence of a coil, which would create a "hole" in the resulting row of coils.

As the row of coils 32 is arranged on the conveyor 33, the conveyor 33 advances the row into a transfer station 40 that includes the transfer mechanism 34 that may take the form of the transfer mechanism 20 of the prior art of FIG. 1, or of another suitable transfer mechanism. When one complete row of coils 32 is on the conveyor 33, the downstream end of the row will typically extend into the transfer station 40. The coiler 31 may then continue to operate under the control of the controller 37 to form coils of the next row, which are placed on the conveyor 33 upstream of the completed row as the conveyor 33 continues to index in response to signals from the controller 37.

When the completed row of coils has been indexed into the transfer station 40 and is ready to be transferred by the mechanism there to assembler 35, which may be similar to assemblers 24 of the prior art machines 10 and 10a discussed in connection with FIGS. 1 and 2 above, the controller 37 causes the conveyor 33 to momentarily pause while the transfer mechanism 34 at transfer station 40 engages the coils 32 on the conveyor 33 for transfer to the assembler 35. Furthermore, it could in some applications also be necessary to cause the coiler 31 to pause, even though it is usually better to avoid doing so. The controller 37 may be programmed to keep track of the pulses sent to the stepper motor 36, or to count feedback pulses from the stepper motor 36 or from some other resolver or decoder 46 connected to a drive or idler wheel for the belts of the conveyor 33, and thereby calculate when the row of formed coils is in position to be transferred by the transfer mechanism of the transfer station 40. Further, the controller 37 could rely upon a signal from a sensor 44 to detect when the row of formed coils is properly positioned in the transfer station 40. If the indexing of the conveyor 33 is relied on by the controller 37, it is preferred that the belts of the conveyor 33 be of the non-stretchable reinforced timing belt type cog belts that can be positively driven by geared drive wheels or measured by geared idler wheels, with no slippage between the wheels and the belts.

Similarly, the controller 37 may control the cycling of the coiler 31 in response to the keeping track of the indexing of the conveyor 33 while maintaining memory registers in which constantly updated information is stored of the positions of coils 32 along the conveyor 33. In addition or in the alternative, the controller 37 may keep track of the coils of the row that have been fed to the conveyor 33 and may rely completely upon a feedback signal from sensor 46 that detects the position of the conveyor 33.

Figure 4:
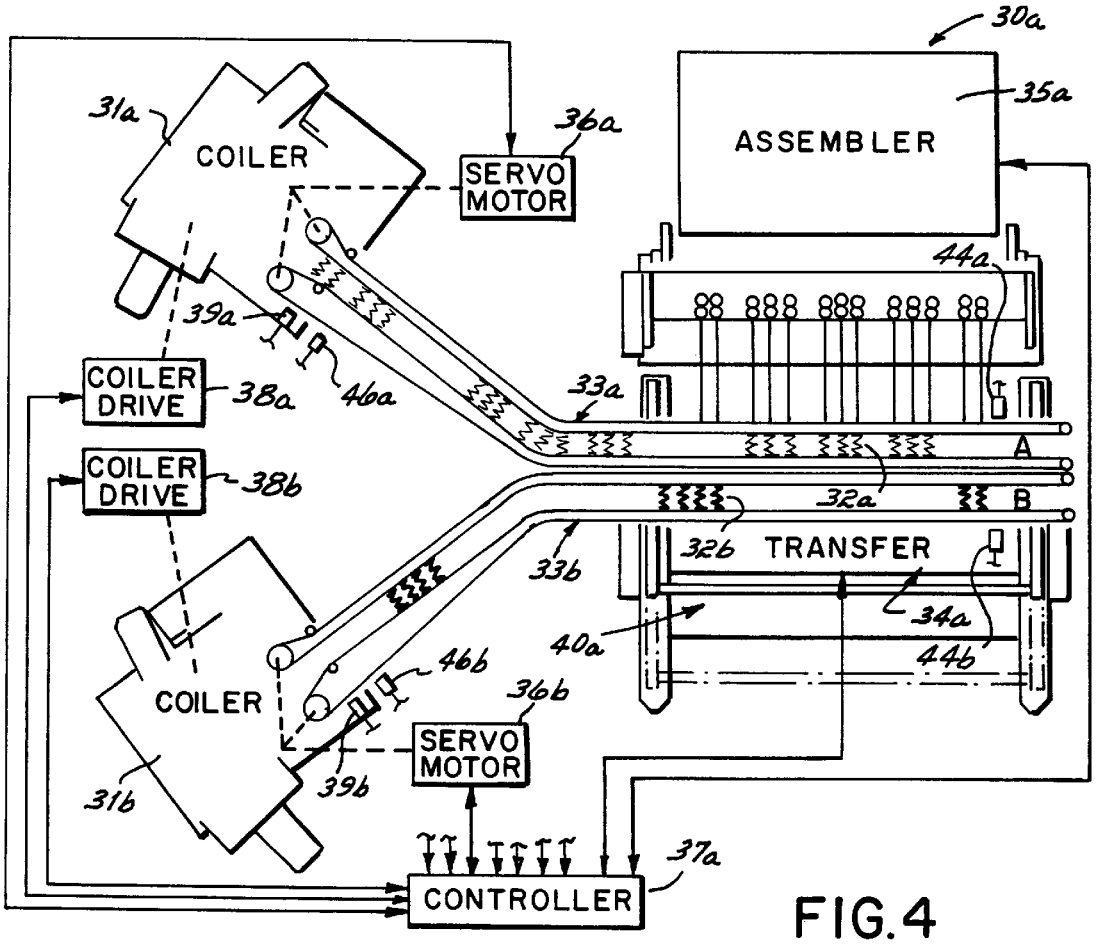
FIG. 4 is a diagrammatic representation similar to FIG. 3 illustrating an alternative embodiment of a spring coil assembly machine of the present invention.

FIG. 4 illustrates an embodiment of a machine [51] *30a* of the invention that includes two assemblies of coilers 31a, 31b and conveyors 33a, 33b of the type illustrated in the embodiment of FIG. 3 as coiler 31 and conveyor 33, arranged in two coil forming and handling lines A and B. The conveyors 33a and 33b differ from the conveyor 33 in a manner similar to the way the conveyors 13a and 13b of FIG. 2 differ from the conveyor 13 of FIG. 1, as explained and described in detail in U.S. Pat. No. 4,413,659, expressly incorporated by reference herein. In cooperation with the conveyors 33a and 33b, a transfer station 40a operates to transfer springs alternately from the conveyors 33a and 33b into an assembler 35a.

In one embodiment, the machine [51] *30a* utilizes two coilers 31a and 31b driven by coiler drives 38a, 38b to produce identical springs 32 to more rapidly supply the springs 32 to the transfer station 40a and the assembler 35a to speed up the assembly operation, which was an objective of the design of FIG. 2 of the prior art. In such an embodiment, the transfer mechanism 34a of the transfer station 40a takes rows of springs alternately from the conveyors 33a and 33b. Each of the assemblies of coiler and conveyor, that is coiler 31a and conveyor 33a and coiler 31b and conveyor 33b, are controlled in the same manner as the assembly of coiler 31 and conveyor 33 of the embodiment of FIG. 3, with each conveyor 33a and 33b being provided with a stepper motor drive 36a and 36b, both controlled by a common controller 37a that provides control to both coilers 31a, 31b and both stepper motors 36a, 36b, as was described in connection with FIG. 3, to provide for the programmed spacing of the coils 32a, 32b along the two respective lines A and B. The controller 37a of FIG. 4 thus provides the function of two separate controllers 37 of FIG. 3, and in addition, coordinates the operation of the two lines A and B with the alternate operation of the transfer mechanism of the transfer station 40a. This coordination involves the separate taking of account of the arrival of the rows of coils 32 from the two lines in position in the transfer station 40a, and the alternate pausing of the two lines in synchronism with the alternate transferring of springs from the respective lines into the assembler 35a. In all other respects, the two lines A and B may be identical to and each have the features of, the single line of the FIG. 3 embodiment described above, including respective sensors 39a, 39b, 44a, 44b and 46a, 46b corresponding in function and relative location on each line A or B to the sensors 39, 44 and 46 of FIG. 3.

In a preferred embodiment of the machine [51] *30a* of FIG. 4, the two lines A and B are set up to provide different kinds of coils 32a and 32b, as for example coils of different sizes, strengths or stiffnesses. Such different coils 32a, 32b might be required by a design of a spring interior to, for example, place stiffer springs (e.g., springs 32b) around the periphery with softer springs (e.g., springs 32a) in the more central portion of the spring interior. In such a machine [51]*30a*, the transfer mechanism 34a at the transfer station 40a operates in conjunction with the assembler 35a to deliver coils 32a and 32b to the assembler 35a in each cycle of the assembler 35a, so that springs of both types can be laced into the same row in the assembled spring interior. To facilitate this, the spacings of the softer springs 32a and the stiffer springs 32b, when the rows thereof are in position at the transfer station 40a for transferring to the assembler 35a, are interleaved in accordance with the programmed pattern of the controller 37a, that is, brought about by a synchronizing of the spacing of the coils 32a and 32b on the respective conveyors 33a and 33b by the coilers 31a and 31b.

Figure 5:
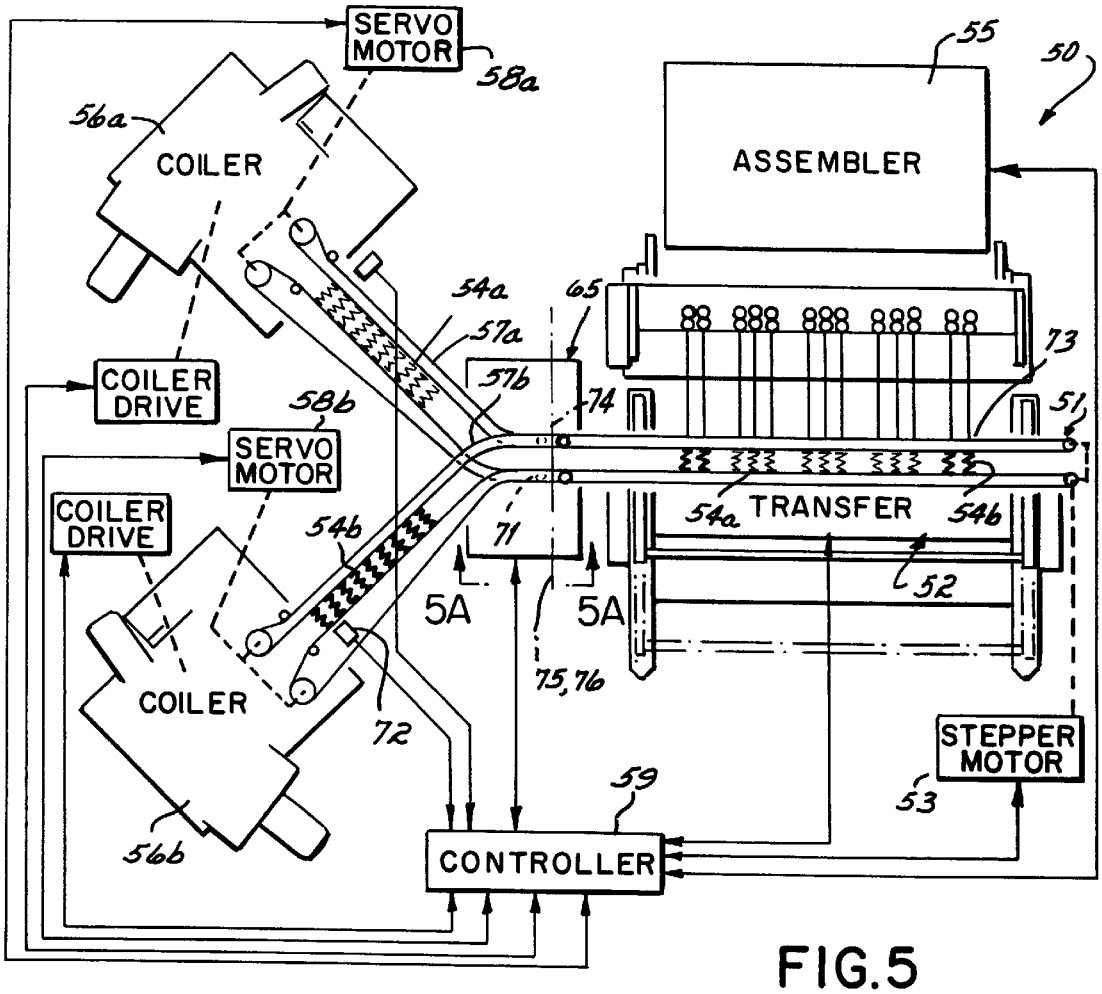
FIG. 5 is a diagrammatic representation of another embodiment of a spring coil assembly machine according to principles of the present invention.

A further embodiment of the invention, which is illustrated in FIG. 5, is a machine 50 that produces a spring interior product having springs of more than one type, such as did the second embodiment 30a of FIG. 4. The machine 50 differs from the machine [51] *30a* in part in that the machine 50 is provided with a transfer conveyor 51 formed of a single pair of endless belts that extend through the transfer station 52. The conveyor 51 is driven by a stepper motor 53. The transfer station 52 differs from the transfer station 40a of FIG. 4, providing for transfer of coils 54a and 54b of different types to the assembler 55 from single conveyor 51, rather than from the two conveyors 33a and 33b of FIG. 4. The machine 50 of FIG. 5 further includes coilers 56a and 56b that differ from coilers 31a and 31b of FIG. 4, providing for discharge conveyors 57a and 57b at their outputs for intermittently feeding coils formed by the coilers 56a and 56b to the upstream end of the transfer conveyor 50. The coilers 56a and 56b each produce coils 54a, 54b that may differ in size or stiffness, as illustrated by softer springs 32a and stiffer springs 32b, as in the embodiment of FIG. 4. Each of the conveyors 57a and 57b are capable of being driven independently of the operation of the coilers 56a and 56b also by the separate servo motors 58a and 58b, which may be the same as the servo or stepper motors 36a and 36b of FIG. 4. The servo motors 58a and 58b, coilers 56a and 56b, transfer station 52 and assembler 55 are driven by a controller 59.

Figure 5A:
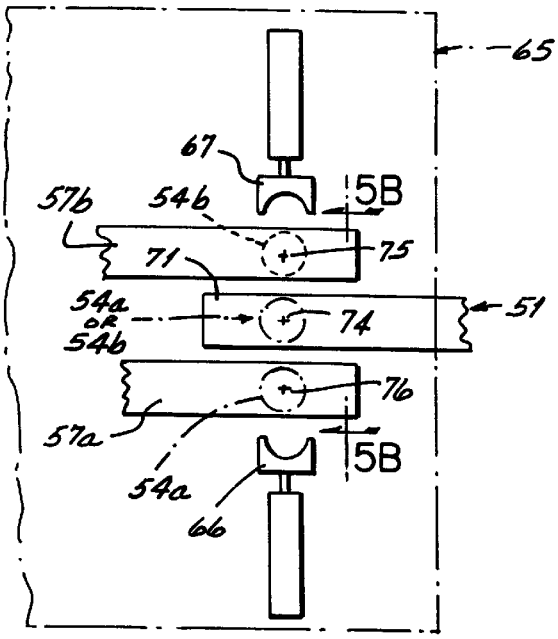
FIG. 5A is a view taken on line 5A—5A of FIG. 5.
Figure 5B:
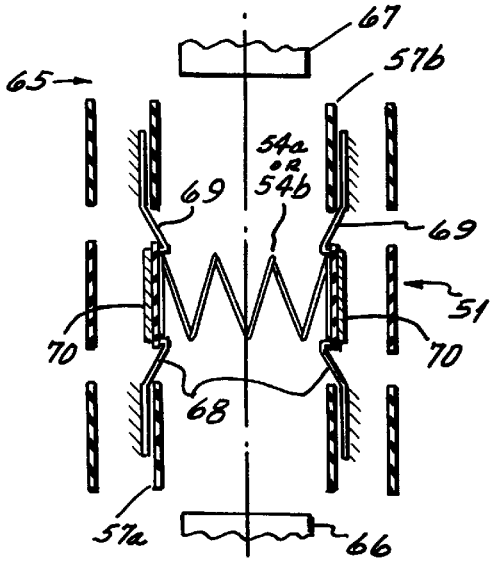
FIG. 5B is a view taken on line 5B—5B of FIG. 5A.

The embodiment of FIG. 5 is also provided with a cross-over station 65 into which extend downstream ends of the conveyors 57a and 57b, one, for example the conveyor 57b, overlying the other, 57a. Between these downstream ends of the conveyors 57a and 57b at the cross-over station 65, extends the upstream end of the transfer conveyor 51, as illustrated in FIGS. 5A and 5B. At the cross-over station 65, any of a variety of mechanisms can be used to selectively move coils 54a and 54b from the respective conveyors 57a and 57b onto the conveyor 51. Such a mechanism may include a pair of solenoid or pneumatically actuated pusher elements 66 and 67, which, when actuated by a signal from the controller 59, move against a respective spring 54a, 54b on conveyor 57a, 57b to slide the spring vertically, up or down, onto the upstream end of the conveyor 51. Stainless steel guide plates 68 and 69 are provided, extending from behind the forward flights of the belts of the conveyors 57a and 57b, over the forward flight of the belts of the conveyor 51, to guide the springs 54a, 54b onto the conveyor 51. The guide plates 68 and 69 have horizontal end sections 71 to trap the spring ends as the springs are pushed onto the transfer conveyor 51 by the pushers 66 and 67. A backing plate 63 holds the belts of the conveyor 51 firmly in position close to the conveyor's end sections 71 to prevent the springs from catching between the plates 68 and 69 and the belts of the conveyor 51.

In operation, with the conveyors 51, 57a and 57b empty of springs, the program of the controller 59 begins initiating cycles of the coilers 56a and 56b by sending triggering pulses to the coilers. Following each cycle of the coilers 56a and 56b, the respective coilers feed a formed coil 54a, 54b onto the upstream end of the respective conveyor 57a, 57b, which causes a feedback signal to be generated to the controller 59, for example from a sensor 72 at the upstream of the conveyor 57a, 57b or from a sensor on the coiler discharge feed mechanism itself. The receipt of such a feedback signal causes the controller 59 to first check to determine whether the respective conveyor 57a, 57b is filled to capacity or has a coil occupying a position at the downstream end of the conveyor 57a, 57b adjacent the pusher 66, 67 at the cross-over station 65. If it is determined that neither condition exists and therefore that the act of indexing the conveyor will not cause a coil to be indexed past the cross-over station 65, a series of pulses is sent to the respective servo stepper motor 58a, 58b to index the respective conveyor 57a, 57b downstream the precise distance required to move the formed spring 54a, 54b, which makes room at the upstream end of the conveyor 57a or 57b for the next coil to be formed.

In the mean time, the controller 59 executes a pattern program routine that establishes the order and placing of springs onto the transfer conveyor 51. In the example illustrated in FIG. 5, a fixed number of the stiffer springs 54b are to be assembled at the ends of each of the rows of coils while sets of the softer springs 54a are to be spaced between the stiffer springs 54b. The controller 59 sends control signals to the cross-over station 65 and to the conveyors 51, 57a and 57b that cause coils 54a, 54b from the coilers 56a, 56b to be placed at the proper spacing and order on the conveyor 51 to present the desired pattern of springs at the transfer station 52. To do this, the controller 59 keeps track of the position of the conveyor 51, as well as all springs 54a and 54b that have been placed upon it, then indexes the conveyors 51, 57a and 57b and triggers the pushers 66, 67 at the transfer station 65 to sequentially add springs 54a, 54b in the proper sequences and at the proper spacings on the conveyor 51.

When a job is started, the controller 59 will run the conveyor 51 until it is clear. Then, the controller 59 sets a counter in a memory within the controller with a count that represents an initial position of the conveyor. The count that is stored is preferably a count of stepper motor pulses or of feedback pulses from a digital resolver on a geared wheel that moves with the cog belts of the conveyor 51. The counter may be some corresponding representation of distance, of a reference point on the conveyor 51 to one or more points along the conveyor 51, such as a registration point 73 with the transfer station 52 and/or a spring load point 74 at the cross-over station 65 at which springs are loaded onto the conveyor 51. The points 73 and 74 may generally be regarded as the intersections of the conveyor 51 with planes perpendicular to the conveyor 51.

Preferably, once the initial values have been set in the controller 59, and a job is started, the controller 59 checks to see if a spring coil 54b is at the offload point 75 at the downstream end of the conveyor 57b at the cross-over station 65 that directly overlies the load point 74. It not, the conveyor 57b is advanced by the sending of pulses by the controller 59 to the stepper motor 58b until a coil 54b is brought to such offloading position 75. When a coil is at this offload position, the conveyor 57b is stopped and will remain stopped until the coil 54b at the position 75 has been removed and loaded onto the conveyor 51. While the conveyor 57b is stopped, operations that require the movement of the conveyor 57b, such as the outfeed from the coiler 56b discussed above, must also stop, and the controller 59 sees that such motions do stop by appropriate signals to the coiler 56b.

When the conveyor 57b has stopped with the spring 54b in the offload position 75, the pusher 67 is activated by the controller 59 to translate the coil 54b downward from the conveyor 57b onto its position 74 on the transfer conveyor 51. Then, when the pusher 67 has retracted and is clear of the conveyor 51, the conveyor 51 is advanced by the sending of pulses from the controller 59 to the stepper motor 53 to advance the conveyor 51 the precise amount of the programmed spacing required between the centers of first two coils 54b of the pattern. This brings the position of the conveyor 51 at which is to be received the second of the coils 54b to the loading position 74 at the cross-over station 65. Then, provided the pusher 67 is clear of the conveyor 57b, the above described procedure brings a coil 54b to the offloading position 75 on the conveyor 57b, and the pusher 67 is reactivated, by a signal from the controller 59, to push the second of the coils 54b from the offload point 75 on the conveyor 57b to the point 74 on the conveyor 51.

When the two stiffer coils 54b have been fed onto the conveyor 51, the controller 59 causes a series of coils 54a to then be similarly fed from the coiler 56a onto the conveyor 51 at spacings called for by the programmed pattern in the controller 59. To carry this out, the controller 59 checks to see if a spring coil 54a is at an offload point 76 at the downstream end of the conveyor 57a at the cross-over station 65 that is directly below the load point 74 of the conveyor 51. If not, the conveyor 57a is advanced by the sending of pulses by the controller 59 to the stepper motor 58a until a coil 54a is brought to such offloading position 76. When a coil 54a is at this offload position 76, the conveyor 57a is stopped and will remain stopped until the coil 54a at the position 76 has been removed and for loading onto the conveyor 51. While the conveyor 57a is stopped, operations that require the movement of the conveyor, such as the outfeed from the coiler 56a discussed above, must also stop, and the controller 59 sees that such motions do stop by appropriate signals to the coiler 56a.

Sensors (not shown) are included at the cross-over station 65 to insure that a spring is present at the load point 74 of the transfer conveyor 51 before it is advanced. This prevents a "hole" from being created in the row of coils, as did the sensors 39 of the embodiments 30 and 30a of FIGS. 3 and 4. Similar sensors are also included at the offload points 75, 76 to prevent coils from being advanced beyond those points by the conveyors 57a, 57b. These sensors render the sensors 72 unnecessary for the preventing of holes in the coil rows, since such spaces would be taken up by the action of the conveyors 57a, 57b in advancing the coils to the offloading points 75, 76, although sensors 72 would facilitate operation of the coilers 56a, 56b.

When the conveyor 57a has stopped with the spring 54a in the offload position 76, the pusher 66 is activated by the controller 59 to translate the coil 54a upward from the conveyor 57a onto its position 74 on the transfer conveyor 51. Then, when the pusher 66 has retracted and is clear of the conveyor 51, the conveyor 51 is advanced by the sending of pulses from the controller 59 to the stepper motor 53 to advance the conveyor 51 the precise amount of the programmed spacing required between the centers of last loaded coil 54a and the next coil called for by the pattern. This brings the position of the conveyor 51 at which is to be received the next of the coils 54a to the loading position 74 at the cross-over station 65. Then, provided the pusher 66 is clear of the conveyor 57a, the above described procedure for bring a coil 54a to the offloading position 76 on the conveyor 57a, and the pusher 66 is reactivated, by a signal from the controller 59, to push the second of the coils 54a from the point 76 on the conveyor 57a to the point 94 on the conveyor 51.

When the last of the coils 54a called for the pattern has been placed on the conveyor 51, the next two coils 54b to be loaded are then loaded sequentially onto the conveyor 51 by the controller 59 carrying out the same procedures described above. Then, when a complete row of coils has been fed onto the conveyor 51, the controller 59 sends to the stepper motor 53 the appropriate number of pulses required to move the first of the coils 54b that was placed onto the conveyor 51 to the registration point 73 at the transfer station 52, whereupon the conveyor 51 is stopped. When the conveyor 51 has stopped, the controller 59 signals the transfer station to initiate a transfer cycle that moves the row of springs 54a, 54b from the conveyor 51 to the assembler 55. Simultaneously, the controller may begin, by loading the first coil 54b of a pattern, the procedure that places a pattern of coils onto the conveyor 51.

Figure 6:
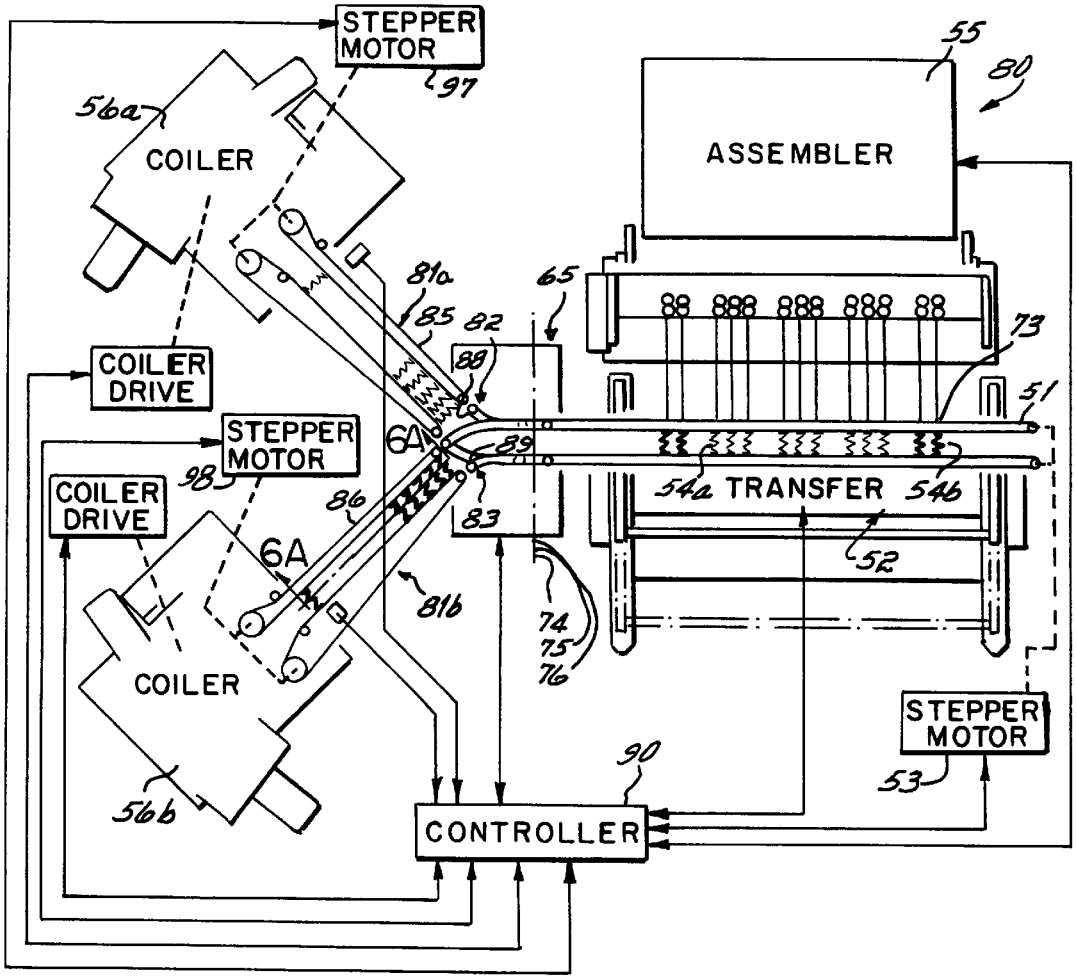
FIG. 6 is a diagrammatic representation of still another embodiment of a spring coil assembly machine according to principles of the present invention.
Figure 6A:
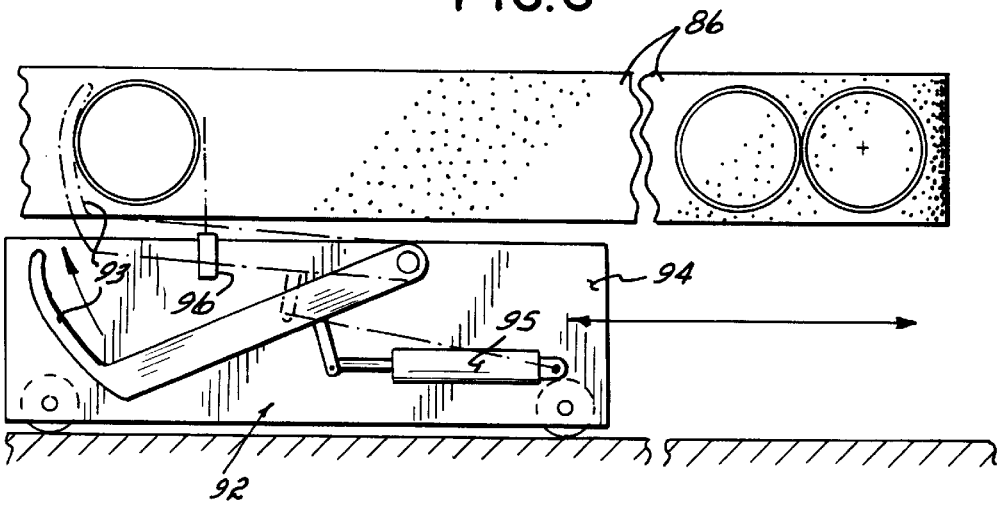
FIG. 6a is a view as seen on line 6a—6a of FIG. 6.

A further embodiment similar to that of FIG. 5 but providing for faster operation and more efficient use of the coilers 56a, 56b is machine 80 illustrated in FIG. 6. In the embodiment of FIG. 6, the conveyors 57a and 57b are replaced with conveyors 81a and 81b, which are each formed of two parts, including cross-over station conveyors 82, 83 and accumulator conveyors 85, 86.

The cross-over station conveyors 82 and 83, respectively, are in the form of the shortened versions of the conveyors 57a, 57b of the embodiment of FIG. 5. The conveyors 82, 83 extend from coil delivery points 88, 89 and each operate, in response to a command signal from a controller 90, to advance a single coil from the respective coil delivery point 88 or 89 to the respective offload point 75, 76. The command signal is generated only under the condition that a coil 54a, 54b is present at the respective coil delivery point 88, 89 no coil is present at the respective offload point 76, 75 and the corresponding pusher 66, 67 is clear of the conveyor 82, 83. Thus, the conveyors 82, 83 will carry only one coil 54a, 54b at a time, and can be triggered by such a control signal whenever such condition exists, so that a coil 54a, 54b is brought to the respective offload point 76, 75 as soon as one is pushed from such point onto the transfer point 74 of the transfer conveyor 51.

The accumulator conveyors 85, 86 are provided to permit the coilers 56a, 56b to operate at full capacity, at least until the accumulator conveyors 85, 86 have been filled with coils 54a, 54b. The accumulator conveyors 85, 86 are both opposed compression belt conveyors like the conveyors 57a and 57b of FIG. 5, but also each include a space eliminating mechanism 92 which functions, in response to a signal from the controller 90, to slide each coil 54a, 54b formed by the coiler 56a, 56b forward between the belts of the accumulator conveyors 85, 86 until they are adjacent the previously formed coil 54a, 54b. The mechanisms 77 include a blade 93 that is carried by a variable stroke reciprocating and preferably electric motor driven carriage 94, which rides in channels of tracks or rails (not shown), and is moved by a pneumatic cylinder 95 upwardly from the carriage 94 behind each coil 54a, 54b that is fed onto the upstream end of the conveyor 85, 86 by the coiler 56a, 56b. The blade 93 engages the last fed coil and slides it along between the belts of the respective conveyor 85, 86 by the downstream motion of the carriage 94, until the space between it and the preceding coil is eliminated, as sensed by a sensor 96 carried by the carriage 94. The belts of the conveyors 85, 86 are servo and preferably stepper motor driven, by motors 97, 98 respectively, in response to signals from the controller 90, whenever the respective discharge conveyor 82, 83 is stopped and no coil 54a, 54b is present at the respective coil delivery point 88, 89. With such arrangement, the speed of the overall apparatus is maximized.

Figure 7:
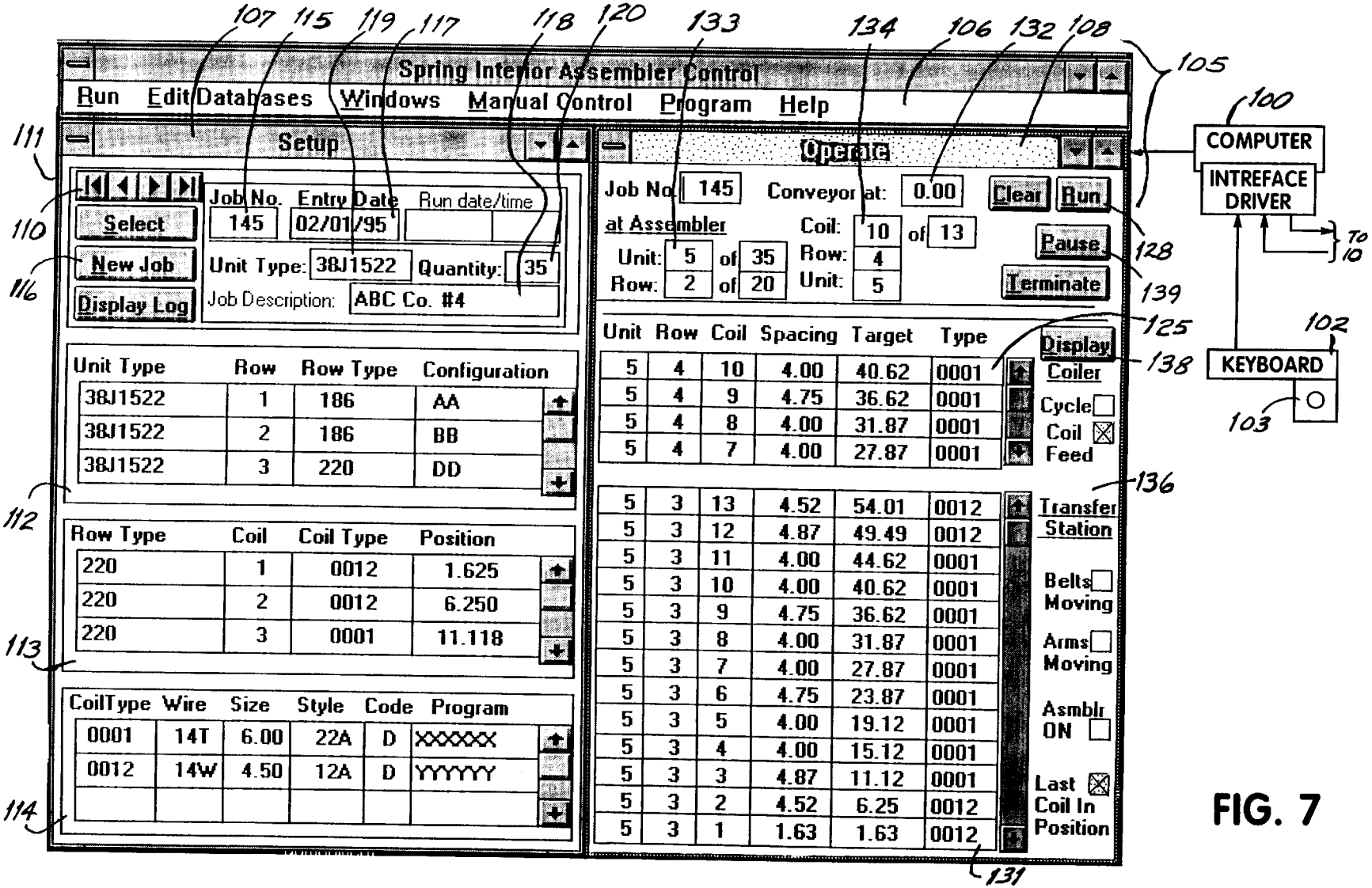
FIG. 7 is a diagram of a control interface display screen of the embodiment of FIG. 3.

The controllers 37, 37a, 59 and 90 of the embodiments of the invention that are respectively illustrated in FIG. 3, 4, 5 and 6 may take any of a number of forms, one of which is described in FIG. 7 as primarily including a programmed general purpose microprocessor based digital computer 100 equipped with appropriate internal or external interfaces and drivers, depicted generally in FIG. 7 as interface 101, for communicating with the motors and sensors of the machines 30, 30a, 50 or 80 of the respective illustrated embodiments. Such a computer 100 may be equipped with a conventional keyboard 102 and pointing device 103, such as a mouse or trackball, for operator input of data and commands, and with a conventional display 105 for the computer 100 to communicate machine and program status information to the operator. Such a controller may be programmed in any of a number of languages, as, for example, Microsoft Visual Basic (TM), in which both a machine operating program and an operator interface program may be written. However, for large scale production of these machines, an industrial programmable logic controller programmed in a conventional ladder logic or other language may be preferred in lieu of the general purpose microcomputer 100 described here, particularly for controlling the operating cycle of the machines 30, 30a, 50 and 80. In addition, utilizing a customized touch screen for the operator interface may be preferred. For purposes of description of the controller operation, a program is described first in connection with the simplest of the illustrated embodiments, which is that of FIG. 5.

The data structure for use with the preferred control program of the computer 100 may be understood by reference to the display 105 in FIG. 7 on which is depicted a monitoring screen graphic that includes a main title bar and menu 106, a setup window 107 and an operating window 108. The menu 106 includes a pull-down Windows menu that provides access to the setup and operate windows 107 and 108. In the setup window 107 an operator can review, add to or alter the contents of any of four database tables, each in its own window or frame. These windows include a job definition window 111, a unit definition window 112, a row definition window 113 and a coil definition window 114.

The job definition window 111 accesses a job or order database table made up of a plurality of records, each identified by an unique job number stored in a Job Number field and displayed in a Job No. text box 115 in the window 111. The job number if written automatically to its field whenever a New Job command button 116 is activated by the operator with the pointing device 103 or from the keyboard 102. When the New Job command is selected, a new blank record is added to the jobs database table with the Job Number field given the next available number, and, in addition, the current date is loaded into an Entry Date field of the record and displayed in an Entry Date text box 117 of the window 111. The operator sets up the new job or order by filling in a text box 118 with Job Description data, which is for user information purposes. The operator also enters a unique Unit Type into a Unit Type text box 119 representing a Unit Type field of the record. When the operator enters a Unit Type, corresponding information of related databases appears in the unit type, row type and coil definition windows 112–114. Whenever the Unit Type field in the job definition window 111 is blank, however, records for all unit types, rows and coils are listed in the corresponding definition windows 112, 113 and 114. The unit type window 112 may be scrolled by the operator until the desired Unit Type is found. By clicking on the desired Unit Type in unit definition window 112, the selected Unit Type is loaded into the Unit Type text box 119 of the job definition window 111. The operator may similarly enter into a provided Units field text box 120 the total number of such units of the selected Unit Type to be made upon execution of the job. The operator may instead select Units=0, which sets the job to an indefinite number of units of the selected Unit Type that will be assembled until the job is manually stopped by the operator.

In addition, one or more other data fields may be provided and displayed in the job window 111, such as Run Date and/or Run Time data of the time and data at which the job is run. Blank information in such field may be used to provide an indication that the job has not been run. The operator may also step through the incomplete jobs by use of a data control 121 that is provided. The interface may be programmed so that whenever the content of Job No. box 115 changes, by use of the data control 121 or by entering a new job, a Select command button 122, which is previously disabled, is enabled to provide the operator with the ability to select a job to be run. Further, whenever a job is stopped in progress, the record is rewritten to replace the Units with the actual number of units produced and the operator is provided with an option to automatically enter a new job number representing the incomplete portion of the original job or to cancel the remaining portion of the job. The window 111 also provides the operator with a Display command button 123, the selection of which opens a modal window (not shown) for viewing the data of all completed jobs in the database.

The units database table displayed in the unit definition window 112 includes information defining the configurations of the various units that can be made. For each Unit Type, the units database table includes a plurality of records having the same Unit Type data in its Unit Type field, one record corresponding to each row of coils of the unit. The records of the units database table link to the jobs database table through the Unit Type data field. When a Unit Type is displayed in the Unit Type text box of job definition window 111, each record of the units database table that relates to the same Unit Type data is displayed in the table of units definition window 112. Each record of the units database table includes a Row Number field uniquely numbered from 1 to the number of rows of coils in the unit. Each such record also includes a field identifying the Row Type of each such row. Each record may also include one or more fields for control of, or downloading to, the assembler, such as row spacing or lacing option data, if the assembler is provided with the capability of the automated selection of such variable features. Such information may also be provided to inform the operator of appropriate manual settings required to assemble the selected type of unit. From the unit definition window 112, the operator may enter or edit unit configuration data, including inserting rows into or the deletion of rows from the unit, in which case the rows will be consecutively renumbered automatically in the records of the units database table. Whenever the operator changes the unit type configuration by altering data in the unit type database table in units definition window 112, a dialog box (not shown) will give the operator the option of saving the changes to the unit type definition under either the same or a new Unit Type, or to cancel the changes and restore the data.

The rows database table displayed in the row definition window 113 includes the information defining the configurations of the various rows of which each of the units can be assembled. For each Row Type, the rows database table includes a plurality of records having the same Row Type data in its Row Type data field, one record corresponding to each coil of the row. The records of the rows database table link to the units database table of the units definition window 112 through the Row Type data field. Each record of the rows database table includes a Coil Number field uniquely numbered from 1 to the number of coils in the row. Each such record also includes a field identifying the Coil Type. Each record also includes one Coil Position field containing information indicating the distance, in linear units of measure such as inches, from a transverse reference point on the row, preferably representing the point at which the downstream end of the transfer conveyor aligns with the edge, leftmost in the figures, of a spring interior assembly in the assembler. The records may each also include a field for data for control of, or downloading to, the assembler, such as lacing option data, if the assembler is provided with the capability of the automated selection of such variables, or to aid in operator setup of the assembler. From the row definition window 113, the operator may enter or edit row configuration data, including the insertion of coils into or deletion of coils from the rows of coils, in which case the coils will be consecutively renumbered automatically in the rows database table. Such editing is carried out in the same manner as the editing of the unit configuration, described above. When no job is selected in the job definition window 111, all row records are displayed in the row definition window 113. When a job is selected, only the records defining rows of the Unit Type of the selected job are displayed. If further, the operator clicks on any one of the rows in the units definition window 112, only records relating to the selected row are displayed in the row definition window 113.

The coils database table displayed in the coil definition window 114 includes the information defining the configurations of the various coils that make up the rows of which each of the units of the job can be assembled. For each Coil Type, the coils database table includes a record having a Coil Type number or other identifier in a field provided therefor. The records of the coils database table link to the rows database table through the Coil Type data field. Each record of the coils database table may include one or more records of data used to select or operate a coiler to form a coil of the designated coil type. Such data may be downloaded to a coiler, where such a coiler is software configurable, may be used by the controller to operate the toiler to form such a coil, or may be used to display settings to the operator to manually set up the coiler to form the designated type of coil. Preferably, the coiler is provided with feedback circuits for informing the controller how it is set up so the controller can verify the proper settings against the information from the coils database table, which is linked through the rows database table and units database table to the jobs database table, when the job is run. In multiple coiler machines such as those of the embodiments of FIGS. 4, 5 and 6, the Coil Type information provides a capability of selecting the coiler to which cycle triggering commands are to be sent and from which outfeed conveyors are to be controlled. From the coil type window 114, the operator may enter or edit coil configuration data, including the addition of new coil types and the changing or deletion of previously defined coil types. Such editing is preferably controlled and carried out in the manner provided for the units and rows database tables described above. When a job is selected, only the records defining coils of the Unit Type of the selected job are displayed. If further, the operator clicks on any one of the rows in the units definition window 112, only records relating to Coil Types that appear in the selected row are displayed in the coil definition window 114. Further, if the operator clicks on any one of the coils in the rows definition window 113, only the record relating to the selected Coil Type is displayed in the coil definition window 114.

The setup window 107 illustrated in FIG. 7 shows a display of sample data for the setup of a job on the embodiment of the machine of FIG. 3. The job, as displayed in job type window 111 is assigned an arbitrary or sequential number of 145 and consists of thirty-five units of an arbitrary sample type 38J1522, Units of type 38J1522 are defined in the unit type window 112 by a number of rows, each represented by a record of data, the first three of which are illustrated. The table in the window 112 lists, in order, only those records that have the unit type 38J1522 in the Unit Type field. In the example, there are assumed to be twenty records representing the definitions of twenty coil rows that make up spring interior units of the 38J1522 type. Each of the records in the unit database table displayed in window 112 has a row type specified in a Row Type field. The unit may, for example, include two rows of the row type 186, sixteen rows of the row type 220, and two more rows of the row type 186. Data records of the entire twenty rows may be viewed by scrolling down the list with the scroll bar of the window 112. The two rows of the 186 row type might represent two border rows of stiffer coils, for example, of a coil type 0012, some of which are contained in the type 220 rows described below.

By selecting one of the rows from table 112, for example row 3, all of the records relating to row type 220 are listed in window 113. Rows of the type 220 are, in the example, made up of thirteen coils, the first two of which may be, for example, coils of a type 0012, followed by nine coils of a type 0001, then two more coils of the type 0012. Records from the row type database table representing the first three coils of row type 220 are displayed in list in window 113. As the list indicates, the first coil of the row is spaced 1.625 inches from the border of the unit, the second coil is spaced 6.25 inches from the border of the unit, the third coil is spaced 11.118 inches from the border of the unit, etc. Data on the other coils may be viewed by scrolling down the list with the scroll bar of the window 113. Thus, what has been selected is a job that produces 35 spring interior units of a type 38J1522, that includes 20 rows of 13 coils each. A border of stiffer type 0012 coils that is two coils wide surrounds a central matrix of 9×16 softer coils of a type 0001.

When an operator has set up or selected a job on the interface described above, the operator initiated a Run command button 128 or a command from the Run menu of menu bar 106. In response to the Run command initiation, the microprocessor of the computer 100 executes the program at the illustrated in the flowchart of FIG. 8. Before starting a run, the operator may first execute a Clear command button 127 that runs a startup routine 130 that causes a stepping of conveyors until all coils 12, if any, that might remain in the machine have been transferred through and out of the transfer station and cleared from the machine. In the embodiments of FIGS. 5 and 6, this clearing of the machine includes a coordinated operation of the cross-over station 65 or by providing offloading shoots at the downstream ends of the upper and lower conveyors at the cross-over station 65. Then the setup data from the database tables associated with the job being run is checked or downloaded, as required, for the running of the job. Initial data is loaded to and displayed from text boxes provided in the operating window 108. Then, the operator confirms the data defining the job to be run and thereupon starts the production run by executing the Run command button on the operate window 108.

During the running of the selected Job No. 145, data of the progress of the job is displayed on the operate window 108. The sample data illustrated in FIG. 7 shows the job in progress at the stage illustrated in FIG. 3, in which thirteen coils of a row, for example row 3 of the fifth unit of the job, are on the transfer conveyor 33 and in position to be transferred at the transfer station 40 to the assembler 35. This is represented by the grid table or list 131 in the operate window 108, in which each of the coils of row 3 are listed, with the coil types and target positions along the conveyor 33 set forth. The distance that the conveyor 33 must advance to bring these coils to their target positions is indicated in a text box 132, which shows a distance of 0.00 inches, indicating that the conveyor 33 has moved the coils to their target positions, and that they are ready for transfer to the assembler, as illustrated in FIG. 3. An additional group of text boxes 133 shows that the second row of unit 5 has already been transferred to the assembler 34. A further group of boxes 134 indicates that the tenth coil of the fourth row of unit 5 has been formed and fed onto the upstream end of the conveyor 33. Details on the positions and types of all ten of the coils of row 4 on the upstream end of the conveyor 33 can be viewed by scrolling a list or grid table 135 in the operate window 108. In addition, a column 136 of binary indicators is provided to inform the operator of the status various motors and sensors. In the operate window 108, the lists 131 and 135 are refreshed when the operator executes a Display command button 138 or whenever a machine pauses by execution of Pause button 139, thereby freezing the information in the lists so it can be read by the operator. The other displayed information in the operate window 108 is refreshed as often as the underlying data changes.

Figure 8:
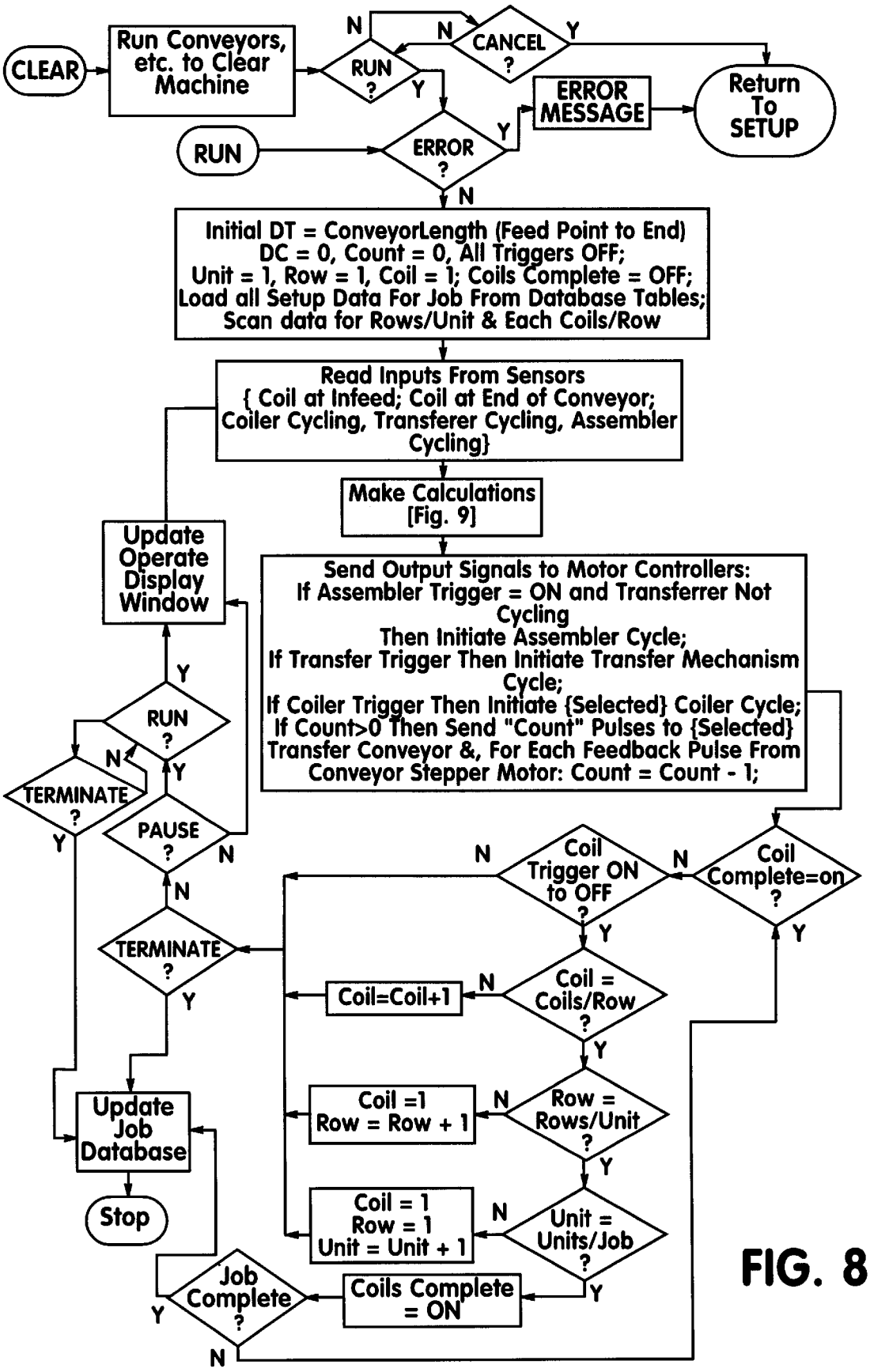
FIG. 8 is a flowchart of a controller program for operation of the embodiment of FIG. 3.
Figure 9:
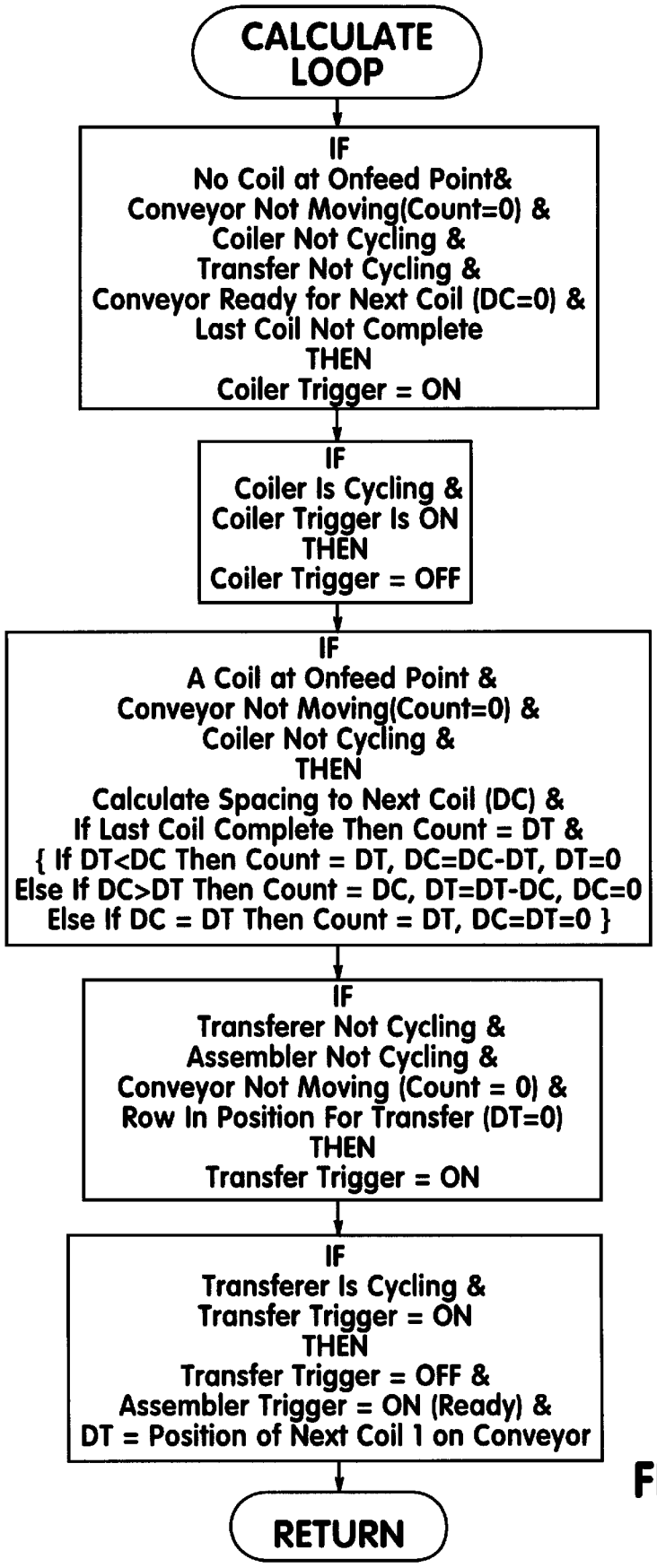
FIG. 9 is a detailed flow chart of the calculation routine of flowchart of FIG. 8.

As the job is run, the microprocessor of the controller computer 100 repeatedly executes a main program loop 140, also illustrated in the flowchart of FIG. 8. The main loop 140 includes a set of steps 139 by which inputs are checked, calculations are made and outputs are set. In the first of such steps, the computer 100 checks the inputs from the various sensors and feedback signals from the various motors and sets the status of logical variables. In the next of the steps of the set 139, the variables are then tested, and based on the states of these variables, e.g. 1s of 0s, calculations and decisions are made, and outputs variables are set, as set forth in the detailed flowchart (FIG. 9). Then, in the third of the steps of the set 139, the output or control signals, such as trigger pulses to the coilers, transfer mechanisms, assembler or cylinder actuators, or pulse streams to stepper motors, are generated based on the calculations and decisions. The main loop 140 also includes tests by which the program cycles until each coil of each row of each unit of the job has been formed and fed onto the conveyor 33, and until each formed coil has been carried by the conveyor 33 to the transfer station 40, transferred to the assembler 34 and assembled into the last unit of the job. In the process, the controller keeps track in its memory of the coils that are formed, the positions of the coils on the conveyor 33 and the positions DT of the first coils of each row on the conveyor 33 in relation to the target position of the coil at the transfer station.

In the calculation routine of FIG. 9, a coiler and conveyor variable calculation routine 141 and a transfer station and assembler variable calculation routine 142 are provided. In the calculation routine, binary variables are calculated and set to control motors and other actuators of the machine 30. The variables calculated in the coiler and conveyor variable calculation routine 141 include a Coiler Trigger that is set ON, or to a value of 1, whenever there is no coil at the coil onload point 39 of the conveyor 33, and the conveyor 33 is not moving as determined by an absence of pulses in a counter that controls the feeding of stepping pulses to the stepper motor 36 of the conveyor 33, and the coiler 31 and transfer mechanism 40 are not in the process of cycling, and there is at least one more coil required to be formed in the job and the conveyor 33 has been advanced to provide the correct spacing of the next coil from the last coil. When the Coiler Trigger is already ON during execution of the calculation routine and the coiler 31 is cycling as determined by a feedback sensor from the coiler 31 that is activated whenever a trigger pulse has been received by the coiler 31, then the Coiler Trigger is turned OFF, or set to zero.

In addition, in the toiler and conveyor variable calculation routine 141, if there is a coil at the onload point 39 and the conveyor 33 is not moving and has not been instructed to move, and the transfer mechanism at the transfer station 40 is not cycling, then a pulse count is made to send to the conveyor stepper motor 36 to properly advance the conveyor 33. First, the spacing from the coil that is at the onload point 39 and the next coil to be formed is calculated from data in the rows database table. This calculation involves the subtraction of the position of the next coil to be formed from the position for the last coil formed. In the example, the position of the last coil, which is coil 10 of row 4 of unit 5, has a target position of 40.62 inches from the end of the transfer station 40. The position of the next coil is 44.62 inches, which is at a spacing of 4.00 inches from the last coil. Thus, a variable DC is calculated as 4.00×P where P is the number of pulses required to be sent to the stepper motor 36 to move the conveyor 33 one inch. If the last coil formed is the last coil of the job, however, a Count of pulses to be sent to the conveyor stepper motor is set at DT, the distance, in pulses, from the first coil of the downstream most row on the conveyor 33 to the downstream end (at sensor 44) of the conveyor 33 at the transfer station 40. Otherwise, DT and DC are compared. If DC is larger than DT, then the Count is set to advance the conveyor the spacing to the next coil, which is 4.00 inches in the example, and the Count is substracted from the stored value of DT, thereby keeping track of the conveyor position and the value in inches to be displayed in text box 132 in window 108. If DT is less than DC, which means that the first coil is closer to its target position at the transfer station than 4.00 inches, the Count is set at DT, DT is set to zero and the Count is subtracted from DC. This advances the completed row to the transfer station and remembers how much more the conveyor 33 must still be advanced, after transfer of the completed row, to achieve the proper spacing before the coiler 31 can be cycled to feed another coil onto the conveyor 33. In the event that DC and DT are equal, one setting of the Count will achieve spacing for the next coil and also position the completed row at the transfer station 40.

In the transfer station and assembler variable calculation routine 142, when the conveyor is not moving (Count=0) and neither the transfer station 40 or the assembler 34 are cycling, a zero value of DT indicates that a completed row of coils is ready and in position for transfer to the assembler 34, whereupon a Transfer Trigger is turned ON, or set to 1.

If the Transfer Trigger is ON and the transfer station 40 is cycling, the Transfer Trigger is turned OFF, an Assembler Trigger is turned ON, and the value of DT is set to the position of the next Coil 1, or first coil of the next row, if any, on the conveyor. Whenever a Coil 1 of any row is fed onto a conveyor, its position is tracked in the same manner as the value of DT discussed above, in order to replace the value of DT when a row of coils is transferred from the conveyor 33.

The embodiment 30 of FIG. 3, because it is provided with only one coiler 31, is mainly suitable for forming coils of the same type or, if of different configurations, then coils that can be formed of the same wire. In the embodiment 30a of FIG. 4, the provision of two coilers 31a and 31b facilitates the use of coils formed from two types of wire, or of more than two types of wire, by provision of a separate coiler for each wire type. For the control of such a machine 30a, the same parameters set forth in the example above in connection with the discussion of the setup window 107 of FIG. 7 may be used to define a job run on the machine 30a. During a job run, for the machine 30a, the operate window 108 will take on the form illustrated in FIG. 7, but differing in that it provides for two conveyor position boxes 132, two set of coiler status boxes 134, two sets of coil lists 131 for each of the transfer ends of the conveyors 33a and 33b, two sets of coil lists 138 for each of the coiler ends of the conveyors 33a and 33b, and an expanded column 136 containing additional indicators in the additional coiler and conveyor. The data relevant to coils in the lines A or B will be presented in the respective boxes and lists for such line.

The program for controller 37a may be generally the same as that for the controller 37 illustrated in FIG. 8, but preferably differs by providing separate indexing variables for each of two coil forming and handling lines A and B that include the respective coilers 31a, 31b and the respective conveyors 33a, 33b. Such separate variables include Counts A and B and conveyor position variables DT A and B for each of the conveyors 33a and 33b, and coil spacing variables DC A and B which are calculated separately for coils of the two types formed respectively on coilers 31a and 31b, excluding coils of the other type. As such, the two lines A and B can run asynchronously, without pausing to wait for the operation of the other, except to synchronize the transfer of completed rows of the respective coil types at the transfer station 40a. Thus, the two lines can operate at their own optimum speeds. In addition, separate indexing variables are maintained to track the formation and movement of A and B type coils, types 0001 and 0012 in the illustrated example. These variables are Coil A and B, Row A and B, and Unit A and B. With the variables so doubled, the controller program of sets the initial conditions of each of the variables in the startup routine 130, then executes the main loop 140 alternately, once for each of the lines A and B, with the program differing from that of FIGS. 8 and 9 in that both Count A and Count B variables and both DT A and DT B variables must be zero in step 142 for the Transfer Trigger to be turned ON, and in that both DT A and DT B are reset when the Transfer Trigger is turned OFF. So operated, the machine 30a of FIG. 4 forms the same units and executes the same job as the machine 30 of FIG. 3.

The control of the embodiment of the machine 50 of FIG. 5 is achieved by a program for the controller 59 that is a minor modification of the program of the controller 37 of FIG. 3. By replacing the Coiler Trigger with a Cross-over Station Trigger, directed selectively to pusher 66 or pusher 67, depending, in the example, on whether the coil called for is of a 0001 or 0012 type, respectively, coils are supplied in order to the onload point 74 of conveyor 51 in the same manner that they were fed to onload point 39 of conveyor 33. Further, triggering the selected pusher 66 or 67 by testing whether the respective conveyor 57a or 57b is moving and whether a coil is present at position 76 or 75, rather than testing the Coiler Cycling condition, the program of FIGS. 8 and 9 will operate the embodiment of FIG. 5. The only addition needed to such program is a step of cycling each of the toilers 56a and 56b to form and feed coils onto the respective infeed conveyors 57a and 57b as rapidly as space at the upstream ends of the conveyors 57a and 57b is available, with no particular coil spacing required. In addition, streams of control pulses are sent to the stepper motors 58a and 58b to move the infeed conveyors 57a and 57b whenever a coil is absent from the respective off load points 76 and 75.

The embodiment of the machine 80 of FIG. 6 may be controlled by programming the controller 90 with a program similar to that of the controller 59 of FIG. 5. The resulting operation may be represented by the information in the operate window 108. The program includes the additional steps of controlling the conveyors 81a and 81b, the carrier 94 and piston 95 and the conveyors 82 and 83 to supply coils to the cross-over station in the manner described in connection with FIG. 6 above.

From the above detailed description of the details of the illustrated embodiments of the invention, it will be apparent to those skilled in the art that various modifications and additions may be made thereto without departing from the principles of the present invention.

Therefore, the following is claimed:

1. An spring interior assembly apparatus for forming spring interior assemblies of arrays of parallel rows of springs, comprising:

a spring interior assembler;

a spring row transfer station upstream of the assembler and operative to transfer a prearranged row of springs from at least one row transfer position to the assembler, a conveyer moveable to carry a prearranged row of formed springs to the transfer position;

a spring former having an outfeed end;

a spring feeder located between the spring former and the conveyor and operative to feed formed springs individually from the spring former to a predetermined position on the conveyor;

a servo motor driveably connected to conveyor to move formed springs held at predetermined positions thereon to the transfer position; and a controller programmed to variably control the relative operation of the servo motor and feeder independently of the respective spring former.

2. The apparatus of claim 1 wherein:

the controller is variable so as to variably control the operation of the servo motor and feeder so as to affect and control the spacing of springs at the predetermined positions on the conveyor.

3. The apparatus of claim 1 wherein:

the spring row transfer station is operative to transfer a prepositioned plurality of springs from each of at least two row transfer positions to the assembler;

the spring former includes at least two spring formers each having an outfeed end;

the conveyer includes at least two conveyors each moveable to carry a prepositioned plurality of formed springs from a respective one of the spring formers to one of the row transfer positions;

the spring feeder includes at least two feeders, each located between the outfeed end of one spring former and a respective one of the conveyors and operative to feed springs individually from the respective spring former each to a predetermined position on the respective conveyor;

the servo motor includes at least two servo motors each driveably connected to a respective one of the conveyors to move formed springs held at predetermined positions on the respective conveyor to the respective row transfer position; and the controller is programmed to variably control the relative operation of the servo motors and feeders so as to affect the spacing of springs at the predetermined positions on the respective conveyor.

4. The apparatus of claim 3 wherein:

the controller is variable so as to variably control the operation of the servo motors and feeders so as to affect and control the spacing of springs at the predetermined positions on the conveyors.

5. The apparatus of claim 3 wherein:

the spring row transfer station is operative to transfer prepositioned pluralities of springs from each of at least two row transfer positions into a single row of springs having a predetermined arrangement of the prepositioned pluralities; and the controller being programmed to variably control the relative operation of the servo motors and feeders so as to affect the predetermined arrangement.

6. The apparatus of claim 3 wherein:

the spring row transfer station is operative to transfer pluralities of springs prepositioned in prearranged rows from each of the transfer positions to the assembler; and the controller being programmed to control operation of the transfer station to transfer prearranged rows of springs alternately from each of the transfer positions.

7. The apparatus of claim I wherein:

the spring former includes at least two spring formers each having an outfeed end;

the spring feeder is located between the outfeed ends at least two of the spring formers and the conveyor and is operative to feed springs individually and selectively from each of the spring formers to a predetermined position on the conveyor; and the controller is programmed to variably control the relative operation of the servo motor and feeder so as to affect the selective positioning of springs from the spring formers at the predetermined positions on the conveyor.

8. The apparatus of claim 7 wherein:

the spring formers are each operative to form springs of differing configurations; and the controller is programmed to variably control the relative operation of the servo motor and feeder so as to affect the selective positioning of springs from the spring formers at the predetermined positions on the conveyor.

9. The apparatus of claim 7 wherein:

the spring feeder includes at least two infeed conveyor sections, each located between the outfeed end of one of the spring formers and the conveyor, each spring former being cyclically operative, in response to a trigger signal, to form a spring and deposit the formed spring onto a corresponding conveyor section; and the controller is programmed to selectively generate trigger signals to each of the [coil] *spring* formers to affect the formation of springs thereby and to variably control the relative operation of the conveyor sections in synchronization with the operation of the servo motor so as to affect the selective positioning of springs from the spring formers at the predetermined positions on the conveyor.

10. The apparatus of claim 7 wherein:

the spring feeder includes at least two infeed conveyor sections, each located between the outfeed end of one of the spring formers and the conveyor, each spring former being cyclically operative, in response to a trigger signal, to form a spring and deposit the formed spring onto a corresponding conveyor section;

each infeed conveyor section including a spring accumulator mechanism operable to receive formed springs deposited at arbitrary positions thereon by a spring former, the accumulator mechanism being controllable to release springs for selective positioning on the conveyor at the predetermined positions therefor; and the controller is programmed to coordinate the operation of the accumulator mechanism, spring formers and conveyor sections to facilitate optimum utilization of the spring formers.

11. The apparatus of claim I further comprising:

means, including the controller, for variably controlling the operation of the servo motor and feeder and for affecting and controlling the spacing of springs at the predetermined positions on the conveyor.

12. The apparatus of claim 1 wherein:

the spring row transfer station includes means for transferring a prepositioned plurality of springs from each of at least two row transfer positions to the assembler;

the spring former includes at least two spring formers each having an outfeed end;

the conveyer includes means including at least two conveyors for carrying a prepositioned plurality of formed springs from a respective one of the spring formers to one of the row transfer positions;

the spring feeder includes at least two feeders, each located between the outfeed end of one spring former and a respective one of the conveyors and operative to feed springs individually from the respective spring former each to a predetermined position on the respective conveyor;

the servo motor includes means for moving each respective one of the conveyors and formed springs held at predetermined positions thereon to the respective row transfer position; and the controller includes means for variably controlling the relative operation of the moving means and feeders and for affecting the spacing of springs at the predetermined positions on the conveyors.

13. The apparatus of claim 12 wherein:

the controller includes means for variably controlling the operation of the moving means and feeders and for affecting and controlling the spacing of springs at the predetermined positions on the conveyors.

14. The apparatus of claim 12 wherein:

the spring row transfer station includes means for transferring prepositioned pluralities of springs from each of at least two row transfer positions into a single row of springs having a predetermined arrangement of the prepositioned pluralities; and the controller includes means for variably controlling the relative operation of the moving means and feeders and for affecting the predetermined arrangement.

15. The apparatus of claim 12 wherein:

the spring row transfer station includes means for transferring pluralities of springs prepositioned in prearranged rows from each of the transfer positions to the assembler; and the controller includes means for controlling the operation of the transfer station to transfer prearranged rows of springs alternately from each of the transfer positions.

16. The apparatus of claim 1 wherein:

the spring former includes at least two spring formers each having an outfeed end;

the spring feeder is located between the outfeed ends at least two of the spring formers and the conveyor;

the apparatus includes means including the feeder for feeding springs individually and selectively from each of the spring formers to a predetermined position on the conveyor; and the controller includes means for variably controlling the relative operation of the servo motor and feeder so as to affect the selective positioning of springs from the spring formers at the predetermined positions on the conveyor.

17. The apparatus of claim 16 wherein:

the spring formers are each operative to form springs of differing configurations; and the controller includes means for variably controlling the relative operation of the servo motor and feeder and for affecting the selective positioning of springs from the spring formers at the predetermined positions on the conveyor.

18. The apparatus of claim 16 further comprising:

means for variably controlling the relative operation of the components of the machine to affect the selective positioning of springs from the spring formers at the predetermined positions on the conveyor.

19. The apparatus of claim 16 wherein:

the spring feeder includes means for accumulating formed springs and for releasing springs for selective positioning on the conveyor at the predetermined positions therefor.

20. A method of forming spring interiors comprising the steps of:

providing a spring interior assembler;

providing a coil row transfer station upstream of the assembler;

providing at least one conveyer extending through the transfer station;

providing a coil former adjacent the conveyor;

operating the coil former through a plurality of cycles, each to form one spring;

feeding each formed spring onto the conveyor upstream of the transfer station;

between each feeding of a spring onto the conveyor, advancing the conveyor an independent distance so as to affect independent spacings between adjacent springs on the conveyor;

advancing a row of springs to the transfer station;

transferring the advanced row of springs from the transfer station to the assembler;

repeating the operating, feeding advancing and transferring steps; and with the assembler, assembling a plurality of transferred rows of springs into a spring interior.

*21. A spring interior assembly apparatus for forming spring interior assemblies of arrays of parallel rows of springs, comprising:*

*a spring interior assembler;*

*a spring row transfer station upstream of the assembler and operative to transfer a prearranged row of springs from at least one row transfer position to the assembler;*

*a conveyer moveable to carry a prearranged row of formed springs to the transfer position;*

*at least two spring formers, each having an outfeed end;*

*a spring feeder located between each spring former and the conveyor and operative to feed formed springs individually from the spring formers to predetermined positions on the conveyor;*

*a servo motor driveably connected to the conveyor to move formed springs held at predetermined positions thereon to the transfer position; and*

*a controller programmed to variably control the relative operation of the servo motor and feeder.*

*22. The apparatus of claim 21 wherein:*

*the controller is programmed to variably control the relative operation of the spring formers.*

*23. The apparatus of claim 21 wherein:*

*the controller is variable so as to variably control the operation of the servo motor and feeder so as to affect and control the arrangement of springs at the predetermined positions on the conveyor.*

*24. The apparatus of claim 21 wherein:*

*the spring row transfer station is operative to transfer a prepositioned plurality of springs from each of at least two row transfer positions to the assembler;*

*the conveyer includes at least two conveyors each moveable to carry a prepositioned plurality of formed springs from a respective one of the spring formers to one of the row transfer positions;*

*the spring feeder includes at least two feeders, each located between the outfeed end of one spring former and a respective one of the conveyors and operative to feed springs individually from the respective spring former each to a predetermined position on the respective conveyor;*

*the servo motor includes at least two servo motors each driveably connected to a respective one of the conveyors to move formed springs held at predetermined positions on the respective conveyor to the respective row transfer position; and*

*the controller is programmed to variably control the relative operation of the servo motors and feeders so as to affect the spacing of springs at the predetermined positions on the respective conveyor.*

*25. The apparatus of claim 24 wherein:*

*the controller is variable so as to variably control the operation of the servo motors and feeders so as to affect and control the spacing of springs at the predetermined positions on the conveyors.*

*26. The apparatus of claim 24 wherein:*

*the spring row transfer station is operative to transfer prepositioned pluralities of springs from each of at least two row transfer positions into a single row of springs having a predetermined arrangement of the prepositioned pluralities; and*

*the controller being programmed to variably control the relative operation of the servo motors and feeders so as to affect the predetermined arrangement.*

*27. The apparatus of claim 24 wherein:*

*the spring row transfer station is operative to transfer pluralities of springs prepositioned in prearranged rows from each of the transfer positions to the assembler; and*

*the controller being programmed to control operation of the transfer station to transfer prearranged rows of springs alternately from each of the transfer positions.*

*28. The apparatus of claim 21 wherein:*

*the spring feeder is located between the outfeed ends of the spring formers and the conveyor and is operative to feed springs individually and selectively from each of the spring formers to a predetermined position on the conveyor; and*

*the controller is programmed to variably control the relative operation of the servo motor and feeder so as to affect the selective positioning of springs from the spring formers at the predetermined positions on the conveyor.*

*29. The apparatus of claim 28 wherein:*

*the controller is programmed to variably control the relative operation of the spring formers.*

*30. The apparatus of claim 28 wherein:*

*the spring formers are operative to form springs of differing configurations; and*

*the controller is programmed to variably control the relative operation of the servo motor and feeder so as to affect the selective positioning of springs from the spring formers at the predetermined positions on the conveyor.*

*31. The apparatus of claim 30 wherein:*

*the controller is programmed to variably control the relative operation of the spring formers.*

*32. The apparatus of claim 28 wherein:*

*the spring feeder includes at least two infeed conveyor sections, each located between the outfeed end of one of the spring formers and the conveyor, each spring former being cyclically operative, in response to a trigger signal, to form a spring and deposit the formed spring onto a corresponding conveyor section; and*

*the controller is programmed to selectively generate trigger signals to each of the spring formers to affect the formation of springs thereby and to variably control the relative operation of the conveyor sections in synchronization with the operation of the servo motor so as to affect the selective positioning of springs from the spring formers at the predetermined positions on the conveyor.*

*33. The apparatus of claim 28 wherein:*

*the spring feeder includes at least two infeed conveyor sections, each located between the outfeed end of one of the spring formers and the conveyor, each spring former being cyclically operative, in response to a trigger signal, to form a spring and deposit the formed spring onto a corresponding conveyor section;*

*each infeed conveyor section including a spring accumulator mechanism operable to receive formed springs deposited at arbitrary positions thereon by a spring former, the accumulator mechanism being controllable to release springs for selective positioning on the conveyor at the predetermined positions therefor; and*

*the controller is programmed to coordinate the operation of the accumulator mechanism, spring formers and conveyor sections to facilitate optimum utilization of the spring formers.*

*34. The apparatus of claim 28 further comprising:*

*means, including the controller, for variably controlling the operation of the servo motor and feeder and for affecting and controlling the spacing of springs at the predetermined positions on the conveyor.*

*35. A method of forming spring interiors comprising the steps of:*

*providing a spring interior assembler;*

*providing a coil row transfer station upstream of the assembler;*

*providing at least one conveyer extending through the transfer station;*

*providing at least two coil formers adjacent the conveyor;*

*operating the coil formers through a plurality of cycles, each cycle to form one spring;*

*feeding each formed spring onto the conveyor upstream of the transfer station;*

*after the feeding of a spring onto the conveyor, advancing the conveyor a distance so as to affect spacings between adjacent springs on the conveyor;*

*advancing a row of springs to the transfer station;*

*transferring the advanced row of springs from the transfer station to the assembler;*

*repeating the operating, feeding advancing and transferring steps; and*

*with the assembler, assembling a plurality of transferred rows of springs into a spring interior.*

*36. A method of forming spring interiors comprising the steps of:*

*providing a spring interior assembler;*

*providing a coil row transfer station upstream of the assembler;*

*providing at least one conveyer extending through the transfer station;*

*feeding a plurality of formed springs onto the conveyor upstream of the transfer station;*

*after each feeding of a spring onto the conveyor, advancing the conveyor a distance so as to affect at least two different spacings between different pairs of adjacent springs on the conveyor;*

*advancing a row of springs to the transfer station;*

*transferring the advanced row of springs from the transfer station to the assembler;*

*repeating the operating, feeding advancing and transferring steps; and*

*with the assembler, assembling a plurality of transferred rows of springs into a spring interior.*

*37. The method of claim 36 wherein:*

*the feeding step includes the steps of providing at least two coil formers adjacent the conveyor and operating the coil formers through a plurality of cycles, each cycle to form one spring.*

*38. The method of claim 36 wherein:*

*the feeding step includes the steps of providing at least one coil former adjacent the conveyor and operating the coil former through a plurality of cycles, each cycle to form one spring.*

*39. The method of claim 38 further comprising the step of:*

*controlling the coil former, feeder and conveyor to synchronize the operation of the coil former and the feeding step with the advancing of the conveyor so that*

*formed springs are placed onto the conveyor in a preprogrammed arrangement of the different spring spacings.*

*40. A method of forming spring interiors comprising the steps of:*

*providing a spring interior assembler;*

*providing a coil row transfer station upstream of the assembler;*

*providing at least one conveyer extending through the transfer station;*

*providing at least one coil former adjacent the conveyor and operating the coil former through a plurality of cycles, each cycle to form one spring;*

*feeding a plurality of formed springs from the at least one coil former onto the conveyor upstream of the transfer station;*

*after feeding a spring onto the conveyor, advancing the conveyor a distance so as to affect a spacing between adjacent springs on the conveyor;*

*advancing a row of springs to the transfer station;*

*the spring feeding and conveyor advancing steps being controllable independent of the controlling of the coil former, and being coordinated by a controller;*

*transferring the advanced row of springs from the transfer station to the assembler;*

*repeating the operating, feeding advancing and transferring steps; and*

*with the assembler, assembling a plurality of transferred rows of springs into a spring interior.*

*41. The method of claim 36 wherein:*

*the feeding step includes the step of feeding a plurality of formed springs which differ.*

*42. A method of forming spring interiors comprising the steps of:*

*providing a spring interior assembler;*

*providing a coil row transfer station upstream of the assembler;*

*providing a conveyer extending through the transfer station;*

*feeding a plurality of formed springs of at least two types which differ in wire size, each from a coil former onto said conveyor upstream of the transfer station;*

*advancing the conveyor to affect spacings between adjacent springs fed onto the conveyor;*

*advancing a row of springs to the transfer station;*

*transferring the advanced row of springs from the transfer station to the assembler;*

*repeating the operating, feeding advancing and transferring steps; and*

*with the assembler, assembling a plurality of transferred rows of springs into a spring interior.*

*43. A method of forming spring interiors comprising the steps of:*

*providing a coil row transfer station upstream of a spring interior assembler;*

*providing a conveyer extending through the transfer station;*

*feeding a plurality of formed springs from at least one coil former onto the conveyor upstream of the transfer station, in a predetermined arrangement on the conveyor of springs differing in characteristics selected from the group consisting of spring type, spring shape, spring size, spring stiffness, spring strength, and spring configuration;*

*advancing the conveyor to affect spacings between adjacent springs fed onto the conveyor;*

*advancing a row of springs to the transfer station;*

*transferring the advanced row of springs from the transfer station to the assembler;*

*repeating the operating, feeding advancing and transferring steps; and*

*with the assembler, assembling a plurality of transferred rows of springs into a spring interior.*

* * * * *